US012308528B2

(12) United States Patent
Lee et al.

(10) Patent No.: US 12,308,528 B2
(45) Date of Patent: May 20, 2025

(54) ELECTRONIC DEVICE INCLUDING ANTENNA

(71) Applicant: Samsung Electronics Co., Ltd., Suwon-si (KR)

(72) Inventors: Kookjoo Lee, Suwon-si (KR); Sumin Yun, Suwon-si (KR); Minwoo Lee, Suwon-si (KR); Juseok Lee, Suwon-si (KR); Wonhee Choe, Suwon-si (KR); Chaejun Lee, Suwon-si (KR); Jinwoo Jung, Suwon-si (KR); Jaebong Chun, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/178,994

(22) Filed: Mar. 6, 2023

(65) Prior Publication Data

US 2023/0208052 A1 Jun. 29, 2023

Related U.S. Application Data

(63) Continuation of application No. PCT/KR2021/013031, filed on Sep. 24, 2021.

(30) Foreign Application Priority Data

Sep. 24, 2020 (KR) ........................ 10-2020-0124105

(51) Int. Cl.
*H01Q 21/28* (2006.01)
*H01Q 5/35* (2015.01)

(52) U.S. Cl.
CPC ............... *H01Q 21/28* (2013.01); *H01Q 5/35* (2015.01)

(58) Field of Classification Search
CPC ........ H01Q 1/38; H01Q 1/243; H01Q 1/1271; H01Q 5/35; H01Q 9/065; H01Q 9/0407; H01Q 21/24; H01Q 21/28
See application file for complete search history.

(56) References Cited

U.S. PATENT DOCUMENTS 7,847,753 B2 * 12/2010 Ishibashi .................. H01Q 9/30 343/702
9,652,073 B2 5/2017 Lim et al.
(Continued)

FOREIGN PATENT DOCUMENTS

JP 6444744 B2 12/2018
JP 2019-053343 A 4/2019
(Continued)

OTHER PUBLICATIONS

International Search Report with Written Opinion dated Jan. 14, 2022; International Appln. No. PCT/KR2021/013031.
(Continued)

*Primary Examiner* — Tung X Le
(74) *Attorney, Agent, or Firm* — Jefferson IP Law, LLP

(57) ABSTRACT

An electronic device is provided. The electronic device includes a housing and a display. The display is arranged in the inner space of the housing while being visible from the outside, and includes a curved side portion. The display includes a plurality of conductive mesh patterns that form an antenna. The plurality of conductive mesh patterns includes a first conductive mesh pattern arranged in a first portion of the display and a second conductive mesh pattern arranged on a second portion of the outer periphery of the first portion. The first conductive mesh pattern and the second conductive mesh pattern have different shapes.

15 Claims, 23 Drawing Sheets

(56) References Cited

U.S. PATENT DOCUMENTS

| | | | | |
|---|---|---|---|---|
| 10,474,282 | B2 | 11/2019 | Park et al. | |
| 10,985,450 | B2 | 4/2021 | Yamagishi et al. | |
| 11,088,443 | B2 * | 8/2021 | Ryu | H01Q 1/38 |
| 11,133,581 | B2 | 9/2021 | Seo et al. | |
| 11,165,171 | B2 * | 11/2021 | LeBlanc | H01Q 9/40 |
| 11,271,282 | B2 | 3/2022 | Jang | |
| 11,494,009 | B2 | 11/2022 | Dan et al. | |
| 2009/0051620 | A1 * | 2/2009 | Ishibashi | H01Q 9/16 343/897 |
| 2016/0093939 | A1 | 3/2016 | Kim et al. | |
| 2016/0190678 | A1 | 6/2016 | Hong et al. | |
| 2016/0328057 | A1 | 11/2016 | Chai et al. | |
| 2017/0285844 | A1 | 10/2017 | Park et al. | |
| 2019/0361549 | A1 * | 11/2019 | Gu | H01Q 1/24 |
| 2022/0083172 | A1 * | 3/2022 | Kim | G06F 3/0443 |
| 2022/0201838 | A1 * | 6/2022 | Suzuki | H01Q 1/364 |
| 2023/0059699 | A1 * | 2/2023 | Li | G06F 3/0443 |

FOREIGN PATENT DOCUMENTS

| | | | |
|---|---|---|---|
| KR | 10-2016-0080444 | A | 7/2016 |
| KR | 10-2017-0112494 | A | 10/2017 |
| KR | 10-2018-0014296 | A | 2/2018 |
| KR | 10-2018-0114771 | A | 10/2018 |
| KR | 10-2035689 | B1 | 10/2019 |
| KR | 10-2020-0098898 | A | 8/2020 |
| KR | 10-2020-0108820 | A | 9/2020 |
| KR | 10-2022-0015159 | A | 2/2022 |
| WO | 2021/033805 | A1 | 2/2021 |

OTHER PUBLICATIONS

Korean Office Action dated Sep. 2, 2024, issued in Korean Application No. 10-2020-0124105.

Korean Notice of Patent Grant dated Apr. 7, 2025, issued in Korean Patent Application No. 10-2020-0124105.

* cited by examiner

<Single gap structure>

<Double gap structure >

ELECTRONIC DEVICE INCLUDING ANTENNA

CROSS-REFERENCE TO RELATED APPLICATION(S)

This application is a continuation application, claiming priority under § 365(c), of an International application No. PCT/KR2021/013031, filed on Sep. 24, 2021, which is based on and claims the benefit of a Korean patent application number 10-2020-0124105, filed on Sep. 24, 2020, in the Korean Intellectual Property Office, the disclosure of which is incorporated by reference herein in its entirety.

BACKGROUND

1. Field

The disclosure relates to an electronic device including an antenna and an operation method thereof.

2. Description of Related Art

To meet the demand for wireless data traffic having increased since deployment of 4th generation (4G) communication systems, efforts have been made to develop an improved 5th generation (5G) or pre-5G communication system. For example, a 5th generation (5G) mobile telecommunication system or pre-5G communication system is also called a "beyond 4G network" communication system or a "post long-term evolution (LTE)" system.

The 5G communication system may be implemented in high frequency bands so as to accomplish higher data rates. To decrease propagation loss of the radio waves and increase the transmission distance in the high frequency bands, beamforming, massive multiple-input multiple-output (massive MIMO), full dimensional MIMO (FD-MIMO), array antenna, analog beam forming, large scale antenna techniques are discussed in 5G communication systems.

In a next generation communication system, broadband wireless transmission by using a millimeter wave (mmWave) band or application of a beamforming technique by using a massive antenna has been considered.

The above information is presented as background information only to assist with an understanding of the disclosure. No determination has been made, and no assertion is made, as to whether any of the above might be applicable as prior art with regard to the disclosure.

SUMMARY

A high-frequency may be interrupted by a display including a conductive material and a housing including a conductive material, due to its high straightness, so that an antenna may be used by placing a dielectric layer on the display. An antenna having a patch type may be mainly applied to the antenna, but a mesh type dielectric layer is used in consideration of light transmittance when the antenna is implemented on the display. According to application of an antenna having a mesh structure, a sheet resistance (surface resistance) value of a metal surface implementing a patch is substantially increased, so that an antenna radiation performance is decreased.

Aspects of the disclosure are to address at least the above-mentioned problems and/or disadvantages and to provide at least the advantages described below. Accordingly, an aspect of the disclosure is to provide an electronic device including an antenna which can improve radiation performance in a direction in which a display is oriented.

Additional aspects will be set forth in part in the description which follows and, in part, will be apparent from the description, or may be learned by practice of the presented embodiments.

In accordance with an aspect of the disclosure, an electronic device is provided. The electronic device includes a housing and a display. The display is disposed in an inner space of the housing while being visible from the outside and includes a curved side surface portion. The display includes a plurality of conductive mesh patterns which configure an antenna. The plurality of conductive mesh patterns includes a first conductive mesh pattern disposed in a first portion of the display and a second conductive mesh pattern disposed in a second portion of an outer periphery of the first portion. The first conductive mesh pattern and the second conductive mesh pattern have different shapes.

In accordance with another aspect of the disclosure, an electronic device is provided. The electronic device includes a housing and a display. The display may be disposed in an inner space of the housing while being visible from the outside and includes a curved side surface portion. A plurality of touch patterns is disposed in the front surface of the display, and the display includes a center, an edge of the outer periphery of the center, and the curved side surface portion of an outer periphery of the edge. A plurality of conductive mesh patterns configuring the antenna may be disposed in the center, the edge, and the curved side surface portion. A first antenna mesh pattern having a first shape may be disposed in the center. A second antenna mesh pattern having a second shape different from the first shape may be disposed in the edge. A third antenna mesh pattern different from the second shape may be disposed in the curved side surface portion. The first to third antenna mesh patterns may be disposed adjacent to at least one touch pattern.

According to various embodiments of the disclosure, an antenna mesh pattern may be configured in a shape of a rhombus or a hexagon, based on a sheet resistance (surface resistance) of an antenna, so as to improve the antenna radiation performance.

According to various embodiments of the disclosure, a current direction of an antenna pattern may be configured as a first direction, and a rhombus mesh pattern having a second diagonal (e.g., second direction) substantially orthogonal to the first diagonal (e.g., first direction) may be configured in a dielectric layer, so as to improve the antenna radiation performance.

According to various embodiments of the disclosure, a current direction of an antenna pattern may be configured as a first direction, and a hexagonal mesh pattern having a first diagonal (e.g., first direction) which has the longest length among diagonals and is oriented in a first direction may be configured in a dielectric layer, so as to improve the antenna radiation performance.

According to various embodiments of the disclosure, the shape of the antenna mesh pattern may be gradually changed from a shape of a square to a shape of a rhombus having the length of a first diagonal oriented in a first direction which is longer than the length of a second diagonal substantially perpendicular to the first diagonal, from the center portion of the display toward the curved side surface portion, so that the antenna pattern may not be seen well when viewed from the outside.

According to various embodiments of the disclosure, the shape of the antenna mesh pattern may be gradually changed from a shape of a regular hexagon to a shape of a hexagon having the length of a first diagonal oriented in a first direction which is longer than the length of the other diagonals, from the center portion of the display toward the curved side surface portion, so that the antenna pattern may not be seen well when viewed from the outside.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
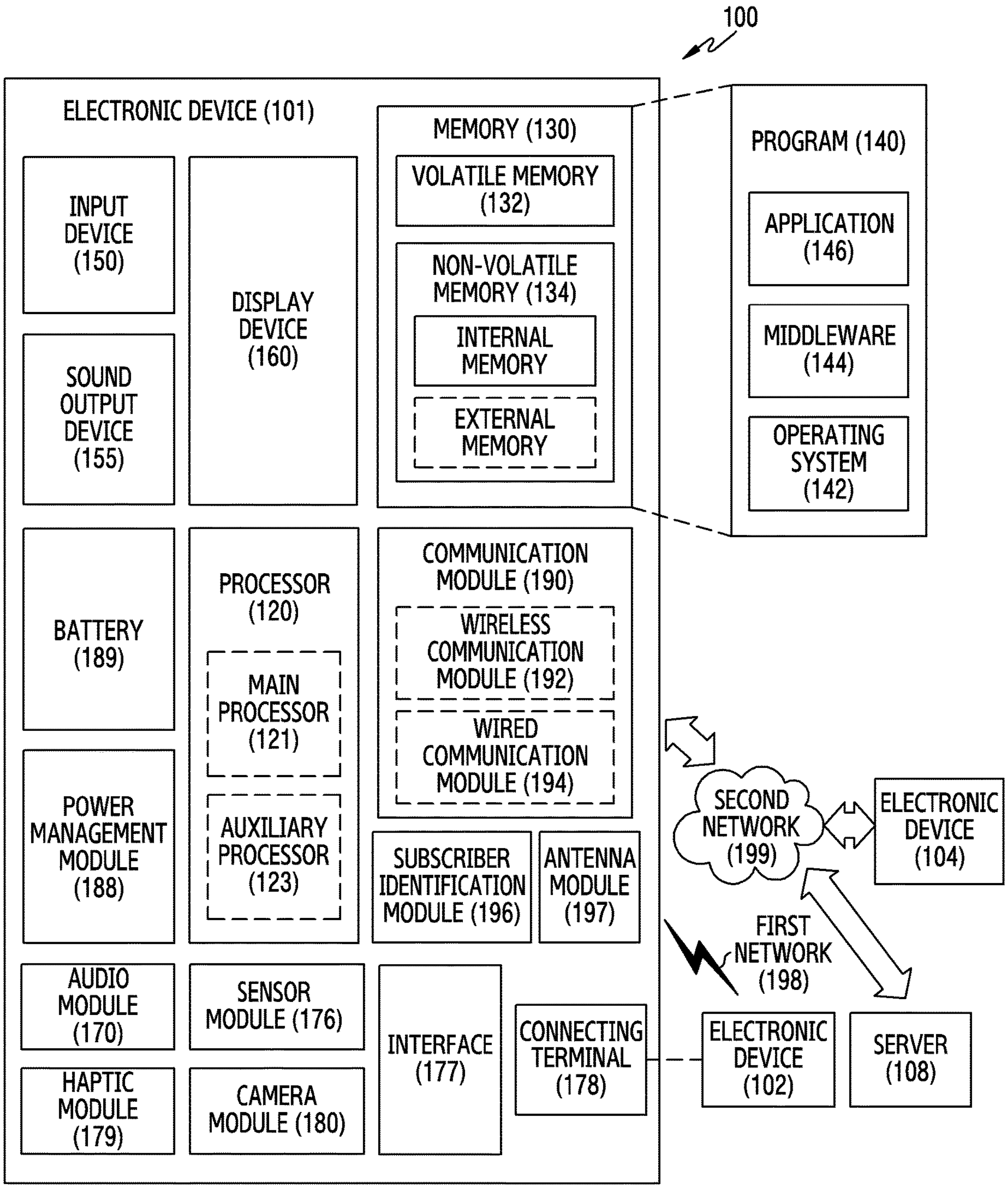
FIG. 1 is a block diagram of an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the display module 160 or the camera module 180) may be omitted from the electronic device 101, or one or more other components may be added in the electronic device 101. In some embodiments, some of the components may be implemented as a single integrated circuit. For example, the sensor module 176 (e.g., a fingerprint sensor, iris sensor, or ambient light sensor) is implemented to be embedded in the display module 160 (e.g., a display).

The processor 120 executes, for example, software (e.g., a program 140) to control at least one other component (e.g., a hardware or software component) of the electronic device 101 coupled with the processor 120, and perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 includes at least one of a main processor 121 (e.g., a central processing unit (CPU) or an application processor (AP)), or an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 controls, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 stores various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and include, for example, an operating system (OS) 142, middleware 144, or an application 146.

The input module 150 receives a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a sensor circuit (e.g., a pressure sensor) adapted to measure the intensity of force incurred by the touch.

The audio module 170 converts a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 detects an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 supports one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 includes a connector via which the electronic device 101 is physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 converts an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 captures a still image or moving images. According to an embodiment, the camera module 180 may include one or more lenses, image sensors, image signal processors, or flashes.

The power management module 188 manages power supplied to the electronic device 101. According to one embodiment, the power management module 188 may be implemented as at least part of, for example, a power management integrated circuit (PMIC).

The battery 189 supplies power to at least one component of the electronic device 101. According to an embodiment, the battery 189 may include, for example, a primary cell which is not rechargeable, a secondary cell which is rechargeable, or a fuel cell.

The communication module 190 supports establishing a direct (e.g., wired) communication channel or a wireless communication channel between the electronic device 101 and the external electronic device (e.g., the electronic device 102, the electronic device 104, or the server 108) and perform communication via the established communication channel. The communication module 190 may include one or more communication processors that are operable independently from the processor 120 (e.g., the application processor (AP)) and supports a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The antenna module 197 transmits or receives a signal or power to or from the outside (e.g., an external electronic device) of the electronic device 101. According to yet another embodiment, the antenna module 197 may include an antenna including a radiating element composed of a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to yet another embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
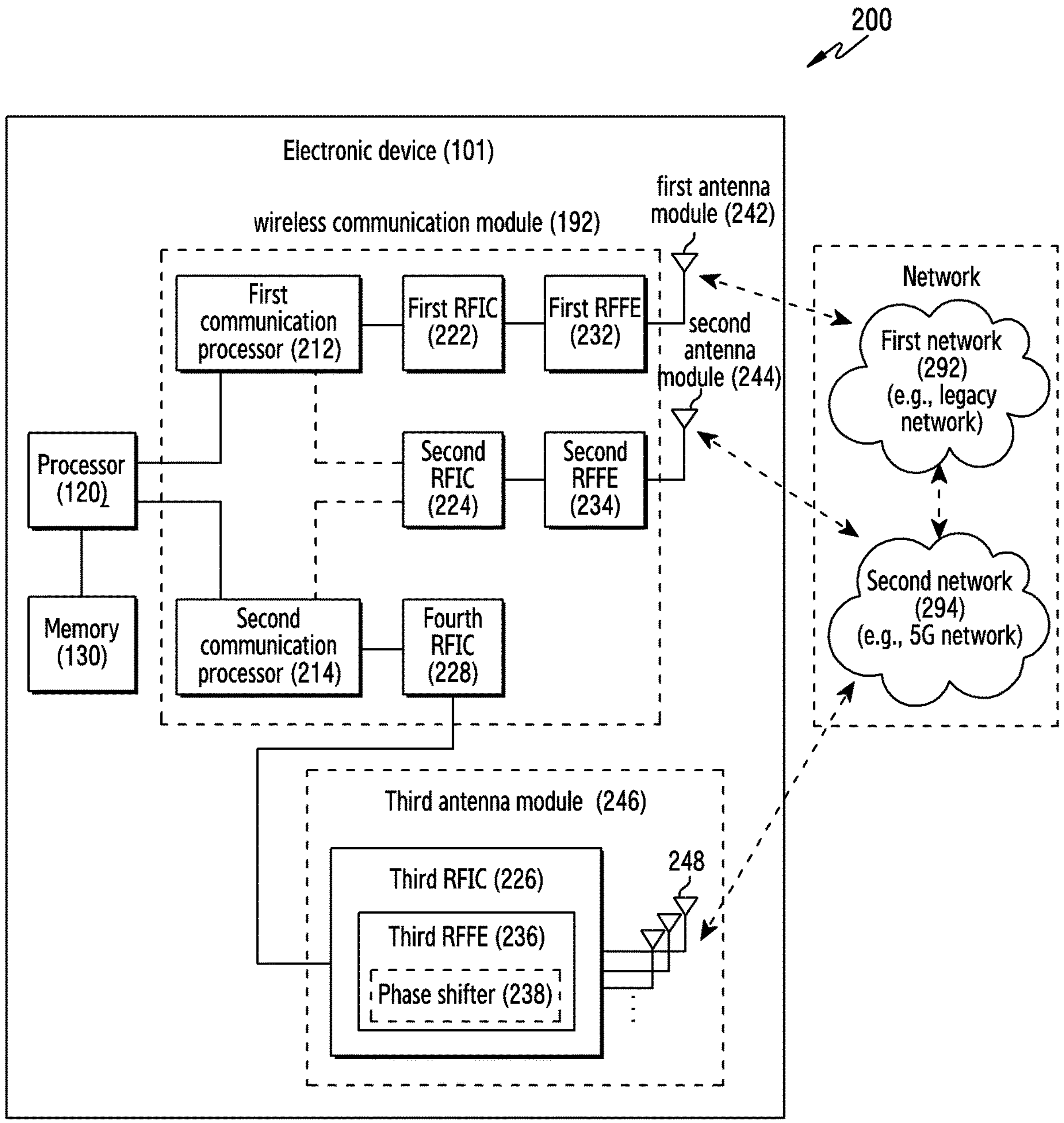
FIG. 2 illustrates a block configuration of a communication module supporting communication with a plurality of wireless networks in an electronic device according to an embodiment of the disclosure.

FIG. 2 illustrates a block configuration of a communication module supporting communication with a plurality of wireless networks in the electronic device according to an embodiment of the disclosure.

Referring to FIG. 2, in a communication module 200 the electronic device 101 may include a first CP 212, a second CP 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one component among components illustrated in FIG. 1, and a second network 199 may further include at least one other network. According to an embodiment, the first CP 212, the second CP 214, the first RFIC 222, the second RFIC 224, the fourth RFIC 228, the first RFFE 232, and the second RFFE 234 may configure at least a part of a wireless communication module 192. According to another embodiment, the fourth RFIC 228 may be omitted or included as a part of the third RFIC 226.

The first CP 212 may establish a communication channel of a band to be used for wireless communication with the first cellular network 292, and support legacy network communication through the established communication channel. According to various embodiments, the first cellular network 292 may be a legacy network including 2nd generation (2G), 3rd generation (3G), 4G or a long-term evolution (LTE) network. The second CP 214 may establish a communication channel corresponding to a designated band (e.g., about 6 gigahertz (GHz)~about 60 GHz) among bands to be used for wireless communication with the second cellular network 294, and support 5G network communication through the established communication channel. According to various embodiments, the second cellular network 294 may be a 5G network defined in 3rd generation partnership project (3GPP). In addition, according to another embodiment, the first CP 212 or the second CP 214 may establish a communication channel corresponding to another designated band (e.g., about 6 GHz or less) among bands to be used for a wireless communication with the second cellular network 294, and support 5G network communication through the established communication channel. According to yet another embodiment, the first CP 212 and the second CP 214 may be implemented in a single chip or a single package. According to various embodiments, the first CP 212 and the second CP 214 may be configured in the processor 120, an auxiliary processor 123, or a communication module 190, and a single chip or a single package. According to yet another embodiment, the first CP 212 and the second CP 214 may be directly or indirectly connected to each other by an interface (not illustrated), so that data or a control signal may be provided or received in one direction or both directions.

The first RFIC 222 may convert a baseband (BB) signal generated by the first CP 212 to a radio frequency (RF) signal of about 700 megahertz (MHz) to about 3 GHz used for the first cellular network 292 (e.g., a legacy network) at the time of transmission. The RF signal may be obtained from the first cellular network 292 (e.g., legacy network) through an antenna (e.g., the first antenna module 242), and may be preprocessed through the RFFE (e.g., the first RFFE 232) at the time of reception. The first RFIC 222 may convert the preprocessed RF signal to the BB signal to enable the same to be preprocessed by the first CP 212.

The second RFIC 224 may convert the BB signal generated by the first CP 212 and the second CP 214 to the RF signal (hereinafter, 5G Sub6 RF signal) of a Sub6 band (e.g., about 6 GHz or less) used for the second cellular network 294 (e.g., a 5G network) at the time of transmission. The 5G Sub6 RF signal may be obtained from the second cellular network 294 (e.g., a 5G network) through the antenna (e.g., the second antenna module 244) and may be preprocessed through the RFFE (e.g., the second RFFE 234) at the time of reception. The second RFIC 224 may convert the preprocessed 5G Sub6 RF signal to the BB signal to enable the 5G Sub6 RF signal to be processed by the CP corresponding to the first CP 212 or the second CP 214.

The third RFIC 226 may convert the BB signal generated by the second CP 214 to the RF signal (hereinafter, 5G Above6 RF signal) of a 5G Above6 band (e.g., about 6 GHz~about 60 GHz) to be used for the second cellular network 294 (e.g., 5G network) at the time of transmission. The third RFIC 226 may preprocess the 5G Above6 RF signal obtained from the second cellular network 294 (e.g., 5G network) through the antenna (e.g., the antenna 248) and may convert the preprocessed 5G Above6 RF signal to the BB signal to enable the 5G Above6 RF signal to be preprocessed by the second CP 214 at the time of reception. According to yet another embodiment, a third RFFE 236 may be configured as a part of the third RFIC 226.

According to yet another embodiment, the electronic device 101 may include a fourth RFIC 228 separately from or as at least a part of a third RFIC 226. In this case, the fourth RFIC 228 may convert the BB signal generated by the second CP 214 to the RF signal (hereinafter, IF signal) of an intermediate frequency (IF) band (e.g., about 9 GHz~about 11 GHz), and then may transmit the IF signal to the third RFIC 226. The third RFIC 226 may convert the IF signal to the 5G Above6 RF signal. At the time of reception, the 5G Above6 RF signal may be received from the second cellular network 294 (e.g., a 5G network) through the antenna (e.g., the antenna 248), and may be converted to the IF signal by the third RFIC 226. The fourth RFIC 228 may convert the IF signal to the BB signal to enable the IF signal to be processed by the second CP 214.

According to yet another embodiment, a first RFIC 222 and a second RFIC 224 may be implemented as at least a part of a single chip or a single package. According to yet another embodiment, the first RFFE 232 and the second RFFE 234 may be implemented as at least a part of a single chip or a single package. According to yet another embodiment, at least one of a first antenna module 242 or a second antenna module 244 may be omitted or coupled to another antenna module to process the RF signal of the plurality of corresponding frequency bands.

According to yet another embodiment, a third RFIC 226 and an antenna 248 may be disposed on a same substrate to configure a third antenna module 246. For example, a wireless communication module 192 or a processor 120 is disposed on the first substrate (e.g., a main PCB or a first printed circuit board). In this case, the third RFIC 226 is disposed on a partial area (e.g., a lower surface) of a second substrate (e.g., a sub PCB or a second printed circuit board) different from the first substrate and the antenna 248 may be disposed on another partial area (e.g., an upper surface), so as to configure the third antenna module 246. The third RFIC 226 and the antenna 248 are disposed on the same substrate to enable the length of a transmission line therebetween to be reduced. In this case, for example, a loss (e.g., diminution), caused by the transmission line, of a signal of a high-frequency band (e.g., about 6 GHz~about 60 GHz) used for 5G network communication may be reduced. Accordingly, the electronic device 101 may improve quality and speed of communication with the second cellular network 294 (e.g., 5G network). According to yet another embodiment, the included third RFFE 236 may be separated from the third RFIC 226 to be configured as a separate chip. For example, the third antenna module 246 includes the third RFFE 236 and the antenna 248 in the second substrate. For example, the third RFIC 226 from which the third RFFE 236 is separated is disposed or not disposed on the second substrate of the third antenna module 246.

According to yet another embodiment, an antenna 248 may be configured as an antenna array including a plurality of antenna elements used for beamforming. In this case, for example, a third RFIC 226 includes a plurality of phase shifters 238 corresponding to a plurality of antenna elements, as a part of the third RFFE 236. The plurality of phase shifters 238 may convert a phase of the 5G Above6 RF signal to be transmitted to the outside of the electronic device 101 (e.g., base station of 5G network) through a corresponding antenna element at the time of transmission. The plurality of phase shifters 238 may convert the phase of the 5G Above6 RF signal received from the outside through the corresponding antenna element to the same phase or substantially the same phase, at the time of reception. This enables transmission or reception between the electronic device 101 and the outside through beamforming.

According to yet another embodiment, the third antenna module 246 may up-convert a transmission signal of the baseband provided by the second CP 214. The third antenna module 246 may transmit an RF transmission signal generated by the up-conversion through at least two transmission/reception antenna elements among the plurality of antenna elements 248. The third antenna module 246 may receive the RF reception signal through at least two reception antenna elements and at least two transmission/reception antenna elements among the plurality of antenna elements 248. The third antenna module 246 may generate a reception signal of the baseband by down-converting the RF reception signal. The third antenna module 246 may output the reception signal of the baseband generated by the down-conversion by the second CP 214. The third antenna module 246 may include at least two reception circuits which one-to-one correspond to at least two reception antenna elements and at least two transmission/reception circuits which one-to-one correspond to at least two transmission/reception antenna elements.

The second cellular network 294 (e.g., a 5G network) may be operated independently (e.g., Stand-Alone (SA)) from or may be operated connected (Non-Stand Alone (NSA)) to the first cellular network 292 (e.g., a legacy network). For example, the 5G network has only an access network (e.g., a 5G radio access network (RAN) or next generation RAN (NG RAN)), and may not have a core network (e.g., next generation core (NGC)). In this case, the electronic device 101 may perform access to an access network of the 5G network, and then access to the outside network (e.g., the internet) under the control of a core network (e.g., evolved packed core (EPC)) of the legacy network. Protocol information (e.g., LTE protocol information) for communicating with the legacy network or protocol information (e.g., new radio (NR) protocol information) for communicating with the 5G network may be stored in the memory 230 to be accessed by the other components (e.g., the processor 120, the first CP 212, or the second CP 214).

According to various embodiments, the processor 120 of the electronic device 101 may execute one or more instructions stored in the memory 130. The processor 120 may include at least one of circuits for processing data, for example, an integrated circuit (IC), an arithmetic logic unit (ALU), a field programmable gate array (FPGA) and large scale integration (LSI). The memory 130 may store data related to the electronic device 101. The memory 130 may include a volatility memory, such as a static random access memory (SRAM) or a random access memory (RAM) including a dynamic RAM (RAM), or may include a non-volatility memory, such as a flash memory, an embedded multimedia card (eMMC), or a solid state drive (SSD), as well as a read only memory (ROM), a magneto-resistive RAM (MRAM), a spin-transfer torque MRAM (STT-MRAM), a phase-change RAM (PRAM), a resistive RAM (RRAM), and a ferroelectric RAM (FeRAM).

According to various embodiments, the memory 130 may store an instruction related to an application and an instruction related to an operating system (OS). The operating system may be system software executed by the processor 120. The processor 120 may execute the operating system to manage a hardware component included in the electronic device 101. The operating system may provide an application programming interface (API) as an application which is remaining software excluding the system software.

According to various embodiments, in the memory 130, one or more applications which are assemblage of a plurality of instructions may be installed. The installing the application in the memory 130 may indicate that the application is stored in a format applicable by the processor 120 connected to the memory 130.

Figure 3:
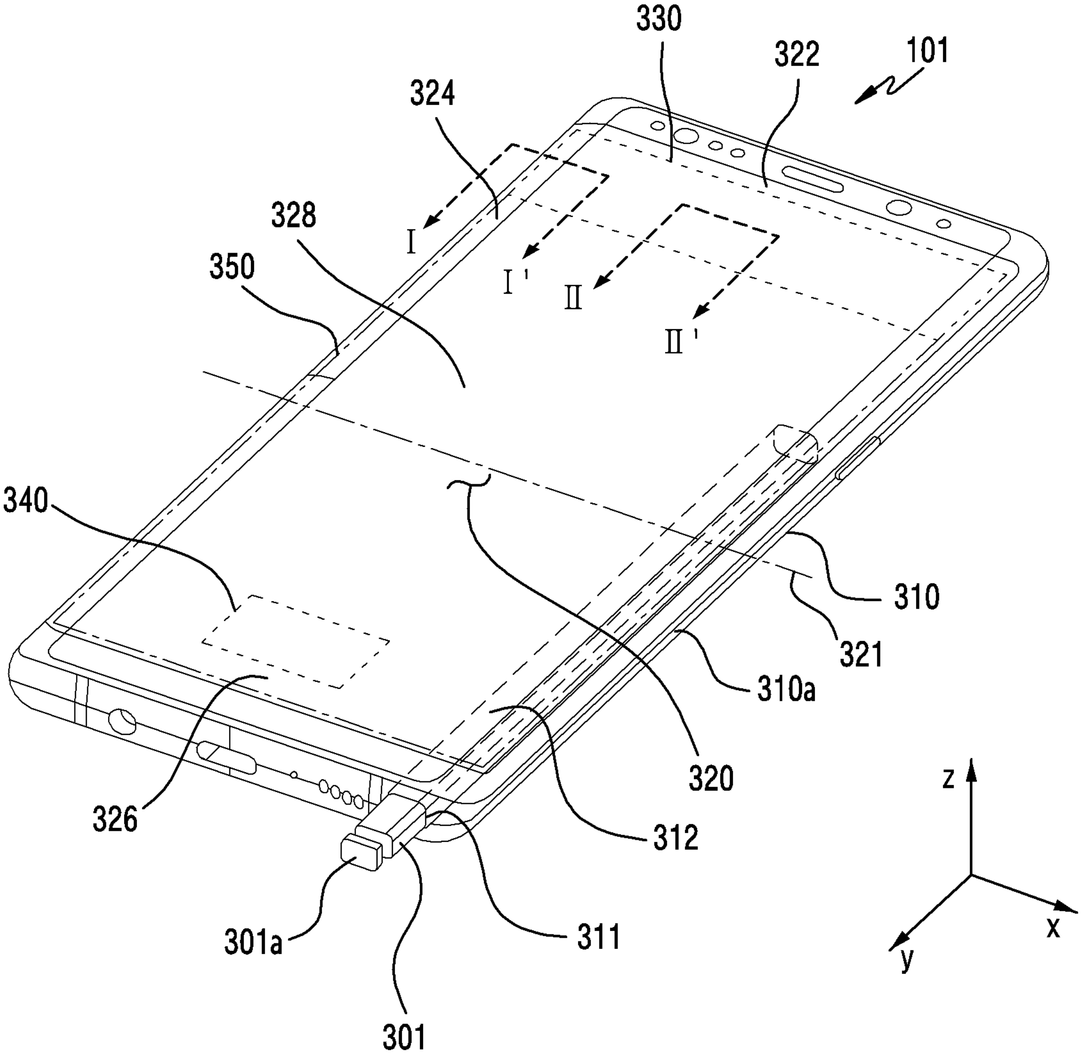
FIG. 3 is a perspective view of an electronic device according to an embodiment of the disclosure.
Figure 4:
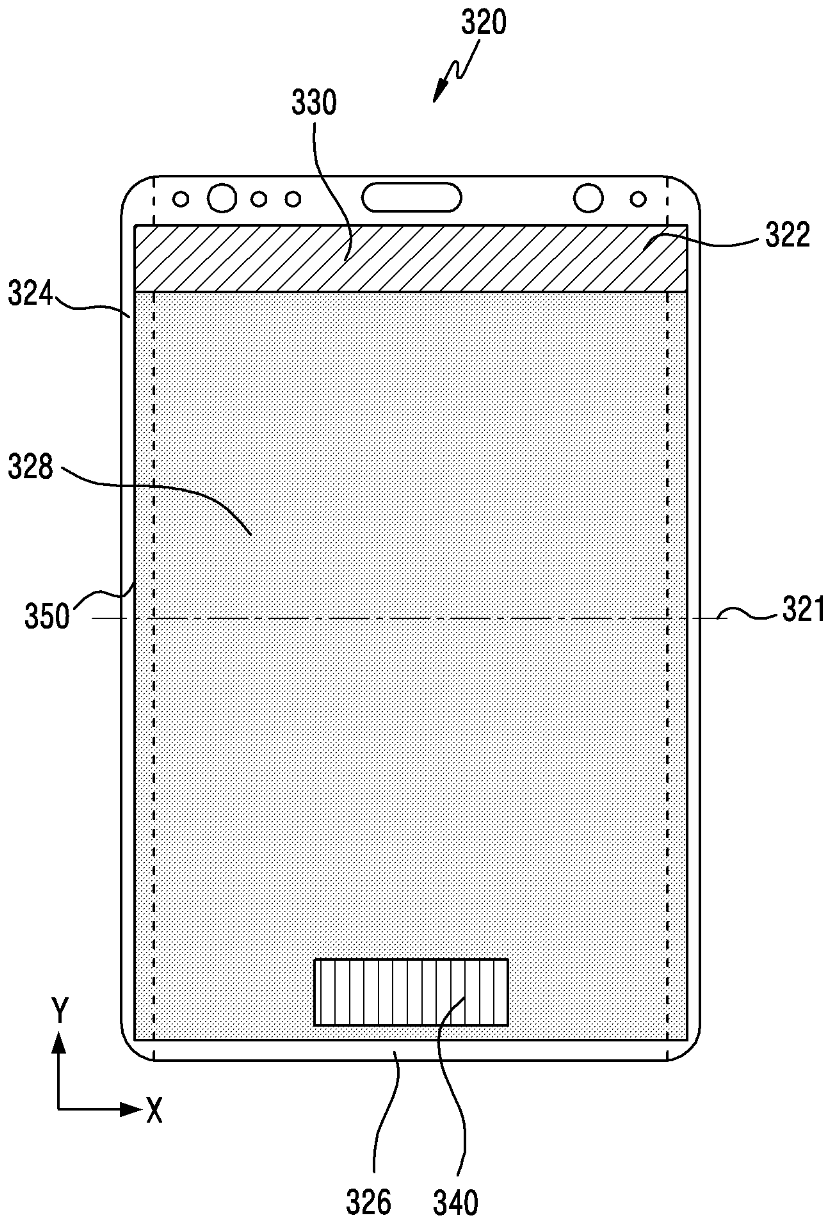
FIG. 4 is a plan view of an electronic device according to an embodiment of the disclosure.

FIG. 3 is a perspective view of an electronic device according to an embodiment of the disclosure. FIG. 4 is a plan view of an electronic device according to an embodiment of the disclosure.

Referring to FIGS. 3 and 4, the electronic device 101 of an embodiment may correspond to the electronic device 101 illustrated in FIG. 1. The electronic device 101 may include a structure into which a stylus pen 301 may be inserted. The stylus pen 301 may be included in the input module 150 of FIG. 1. The electronic device 101 may include a housing 310. A part of the housing 310, for example, a part of a side surface 310*a*, includes a hole 311. The electronic device 101 may include a first inner space 312 which is a receiving space connected to the hole 311 and the stylus pen 301 may be inserted into the first inner space 312. According to another embodiment, the stylus pen 301 may include a first button 301*a* capable of being pressed at the end, so that the stylus pen 301 may be easily taken out from the first inner space 312 of the electronic device 101. When the first button 301*a* is pressed, a rebound mechanism (for example, rebound mechanism by at least one resilient member (e.g., spring)) configured to be linked with the first button 301*a* is operated, so that the stylus pen 301 may be separated from the first inner space 312.

The electronic device 101 may include a display 320 (e.g., the display device 160 of FIG. 1). The display 320 may include a dielectric layer (e.g., a dielectric layer 540 of FIG. 5A). In yet another embodiment, a touch sensor (e.g., a touch pattern 820 of FIG. 8A), an antenna pattern (e.g., a touch pattern 810 of FIG. 8A), or a proximity sensor may be implemented in the dielectric layer. In another embodiment, the antenna pattern may be implemented in the dielectric layer, and the touch sensor or the proximity sensor may be implemented in a layer different from the dielectric layer (e.g., a sensor layer 580 of FIG. 6A).

For example, the electronic device 101 includes at least one of a first area 330, a second area 340, or a third area 350. For example, the first area 330 is disposed in the upper side (e.g., −y-axis direction) of the display 320 with reference to a center line 321 crossing in the X-axis direction of the display 320. The first area 330 may be disposed on an upper end 322 of the electronic device 101 or disposed adjacent to the upper end 322. For example, the second area 340 is disposed on the lower side (e.g., +y-axis direction) of the display 320 with reference to the center line 321. The second area 340 may be disposed on a lower end 326 of the electronic device 101, or disposed adjacent to the lower end 326. For example, the third area 350 is disposed on a side surface portion 324 of the electronic device 101 or disposed adjacent to the side surface portion 324. For example, the third area 350 is disposed on one side or both side edge parts of the display 320.

A screen may be displayed on the side surface portion 324 or a front surface 328 of the display 320. For example, the whole or a part of the first area 330 is included in the front surface 328. The whole or a part of the second area 340 may be included in the front surface 328. The whole or a part of the third area 350 may be included in the side surface portion 324.

For example, the first area 330 (e.g., antenna area) is an area in which the antenna pattern is disposed. For example, the second area 340 (e.g., proximity sensor area) is an area in which a proximity sensor is disposed or an area overlapping the area in which the proximity sensor is disposed. For example, the third area 350 may be an area in which a touch sensor is disposed or an area overlapping the area in which the touch sensor is disposed. For example, the third area 350 is an area in which the touch sensor and the antenna (e.g., an antenna structure 542 of FIG. 5A) are disposed or an area overlapping the area in which the touch sensor and the antenna (e.g., the antenna structure 542 of FIG. 5A) are disposed. In another example, the first area 330 (e.g., antenna area) or the second area 340 (e.g., proximity sensor area) is not limited to the area illustrated in FIG. 3, and may be disposed in one area of the dielectric layer (e.g., the dielectric layer 540 of FIG. 5A).

In yet another embodiment, the electronic device 101 may include a non-foldable phone, a slide phone or a foldable phone. In case that the electronic device 101 is the foldable phone, the display 320 may include a flexible or foldable display. In case that the electronic device 101 is the slide phone, the display 320 may include the flexible display.

According to yet another embodiment, the dielectric layer (e.g., the dielectric layer 540 of FIG. 5A) may be disposed on the side surface portion 324 and the front surface 328 (e.g., surface on which the screen is displayed) of the display 320. In yet another embodiment, the screen may be displayed on the front surface 328 and the side surface portion 324. For example, a mesh pattern (e.g., a conductive mesh pattern 822 of FIG. 8B) is configured in the dielectric layer. The conductive mesh pattern 822 may be configured by a plurality of conductive mesh lines (e.g., a conductive mesh line 546 of FIGS. 7A and 8C).

In yet another embodiment, at least one of the touch pattern (e.g., the touch pattern 810 of FIG. 8A) or the antenna pattern (e.g., an antenna pattern 820 of FIG. 8A) may be configured by using conductive mesh line 546.

Figure 8A:
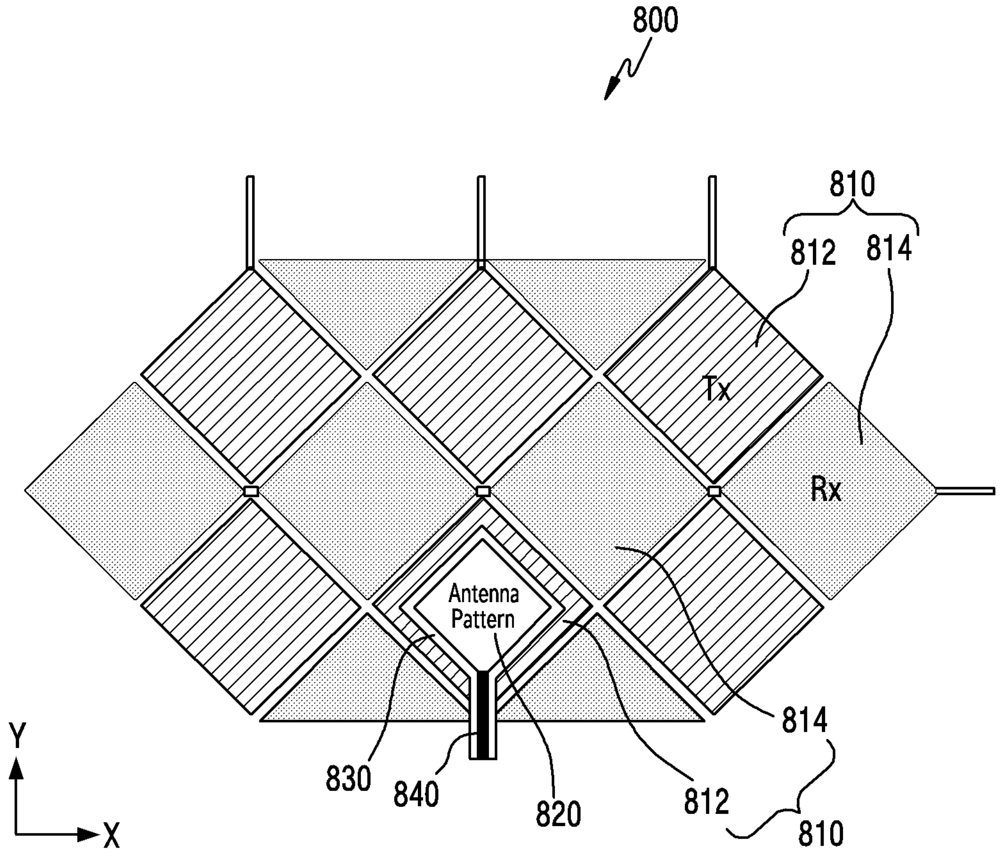
FIG. 8A illustrates a touch pattern and an antenna pattern of an electronic device according to an embodiment of the disclosure.

In yet another embodiment, the touch pattern (e.g., the touch pattern 810 of FIG. 8A and at least one sensor (the sensor module 176 of FIG. 1)) (e.g., a fingerprint sensor, an iris sensor, or an illuminance sensor) may be disposed on the second area 340. For example, at least one sensor is disposed on or beneath a display panel (e.g., a display panel 510 of FIGS. 5A and 6A).

In yet another embodiment, the touch pattern (e.g., the touch pattern 810 of FIG. 8A) and the antenna pattern (e.g., the antenna pattern 820 of FIG. 8A) may be disposed on the third area 350.

In yet another embodiment, a first type antenna pattern may be disposed on the side surface portion 324 and the front surface 328 of the display 320. For example, the first type antenna pattern has a shape of a rhombus having the longer length in a first direction (e.g., X-axis direction) or a shape of a rhombus having the longer length in a second direction (e.g., Y-axis direction). In yet another embodiment, a second type antenna pattern (e.g., an antenna pattern having a shape of a hexagon) or a third type antenna pattern (e.g., an antenna pattern having a shape of a square or an antenna pattern having a shape of a rhombus, in which the lengths of four sides are equal to each other) may be disposed on the side surface portion 324 and the front surface 328 of the display 320.

Figure 5A:
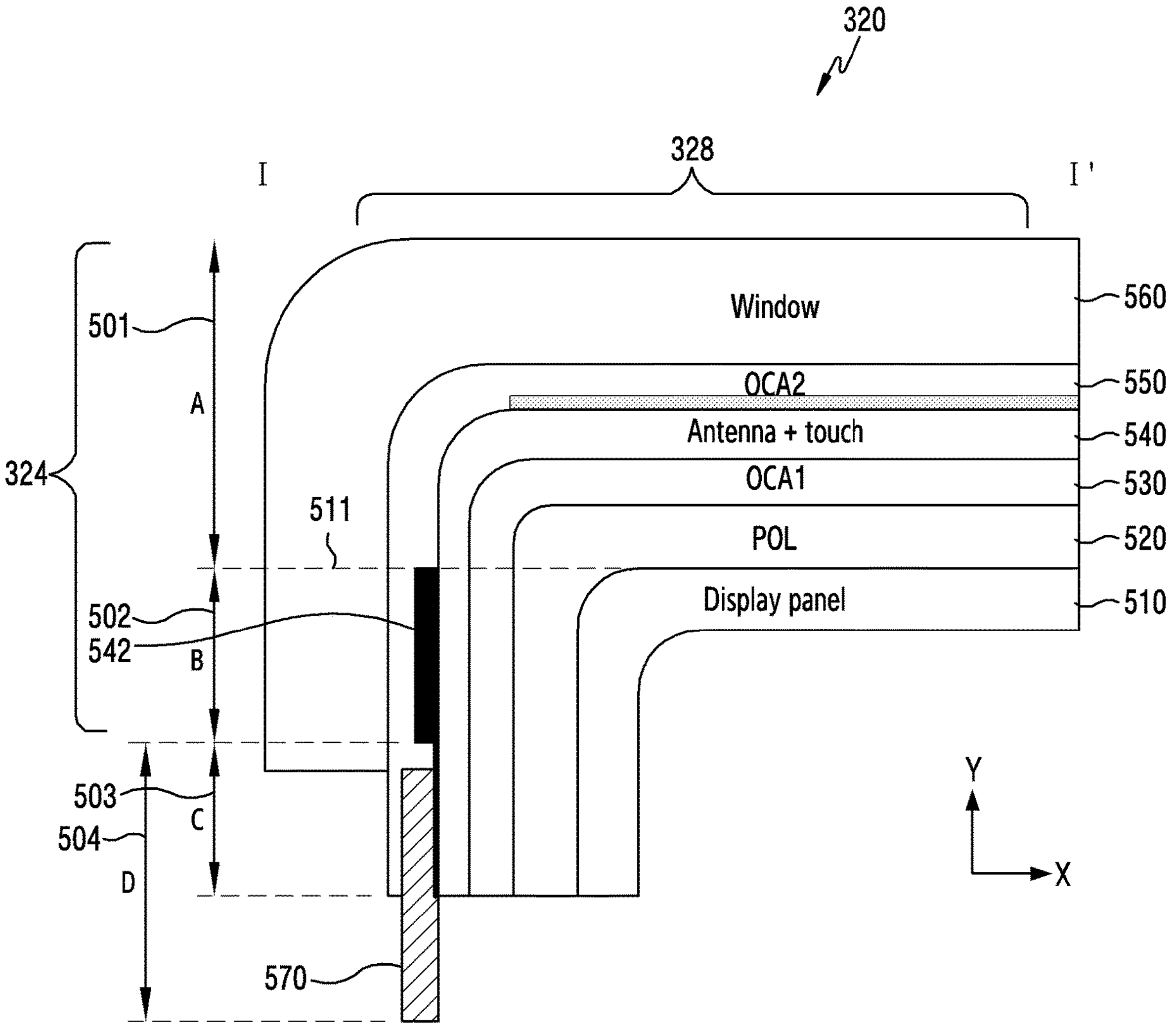
FIG. 5A is a cross-sectional view of the electronic device illustrated in FIG. 3 taken along line I-I' according to an embodiment of the disclosure.

FIG. 5A is a cross-sectional view of the electronic device illustrated in FIG. 3 taken along line I-I' according to an embodiment of the disclosure.

Figure 5B:
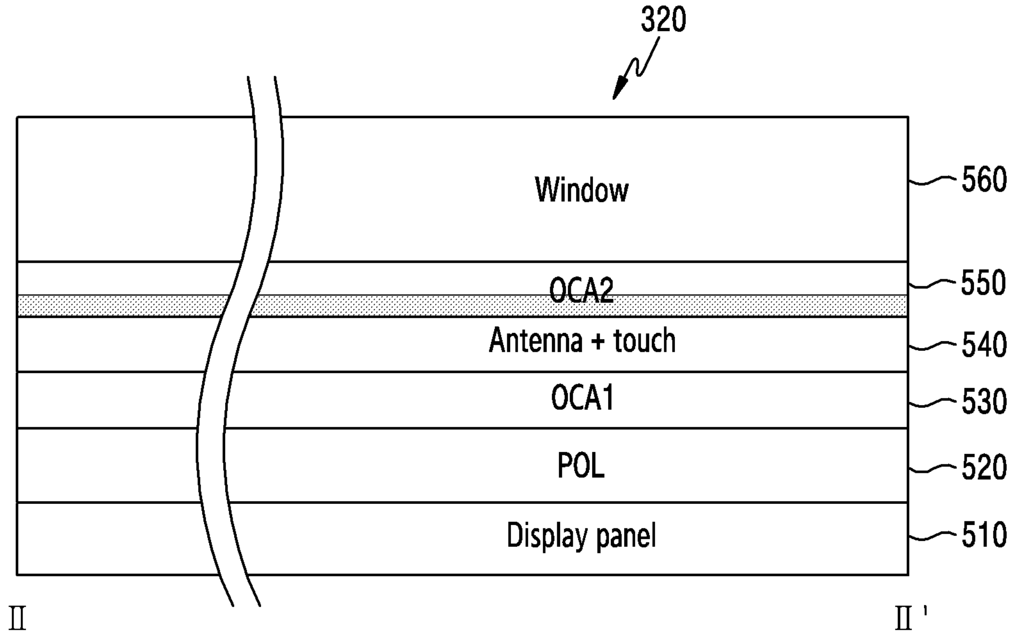
FIG. 5B is a cross-sectional view of the electronic device illustrated in FIG. 3 taken along line II-IF according to an embodiment of the disclosure.

FIG. 5B is a cross-sectional view of the electronic device illustrated in FIG. 3 taken along line II-IF according to an embodiment of the disclosure.

FIGS. 5A and 5B illustrate a cross-section of the display among components of the electronic device.

Referring to FIGS. 5A and 5B, the display 320 includes at least one of the display panel 510, a polarizing layer (POL) 520, a first adhesive member (OCA1) 530 (optical clear adhesive, OCA), the dielectric layer 540, a second adhesive member (OCA2) 550, a window (e.g., Ultra-Thin Glass (UTG)) 560 or a polymer (e.g., polyethylene terephthalate (PET) window), or a flexible printed circuit board (FPCB) 570. In an embodiment, the flexible printed circuit board (FPCB) 570 may be electrically connected to the display 320. According to another embodiment, the display panel 510 may include an organic light emitting diodes (OLED) panel, the liquid crystal display (LCD), or a quantum dot light-emitting diodes (QLED) panel. For example, the display panel 510 includes a plurality of pixels for displaying an image, and one pixel may include a plurality of sub-pixels. In an embodiment, one pixel may include a red sub-pixel, a green sub-pixel, and a blue sub-pixel of three colors. In an embodiment, one pixel may include a red sub-pixel, a green sub-pixel, a blue and a white sub-pixel of four colors. In an embodiment, one pixel may be configured by an RGBG pentile method which includes one red sub-pixel, two green sub-pixels, and one blue sub-pixel.

According to various embodiments, the display 320 may include a control circuit (not illustrated). According to an embodiment, the control circuit may include a printed circuit board and a display driver IC (DDIC) (not illustrated). According to an embodiment, the display 320 may include a touch display driver IC (TDDIC) (not illustrated) for operating a plurality of touch patterns (the touch pattern 810 of FIG. 8A).

In yet another embodiment, the display 320 may include at least one sensor (e.g., the sensor module 176 of FIG. 1) disposed around the control circuit. For example, the sensor may include a fingerprint sensor. However, it is not limited thereto, and the sensor may include an iris sensor or an illuminance sensor.

In yet another embodiment, the polarizing layer 520 may include a PSA to have the thickness of about 90 μm~about 110 μm. The first adhesive member 530 may have the thickness of about 135 μm~about 165 μm. The dielectric layer 540 may have the thickness of about 35 μm~about 45 μm. The second adhesive member 550 may have the thickness of about 135 μm~about 165 μm. The window 560 may have the thickness of about 450 μm~about 550 μm.

In yet another embodiment, the pressure sensitive adhesive (PSA) (not illustrated) may be disposed between the display panel 510 and the polarizing layer 520 to attach the display panel 510 and the polarizing layer 520. The first adhesive member (OCA1) 530 may be disposed between the polarizing layer 520 and the dielectric layer 540 to attach the polarizing layer 520 and the dielectric layer 540. The second adhesive member (OCA2) 550 may be disposed between the dielectric layer 540 and the window 560 to attach the dielectric layer 540 and the window 560. For example, at least one of the first adhesive member 530 or the second adhesive member 550 includes the PSA, a heat-reactive adhesive, a general adhesive, or a double-sided tape, as well as the OCA.

In yet another embodiment, the display 320 may be configured to allow the side surface portion (e.g., the side surface portion 324 of FIGS. 3 and 4) to have curvature. The touch pattern (e.g., the touch pattern 810 of FIG. 8A) (or touch sensor) may be disposed on the side surface portion 324 and the front surface (e.g., the front surface 328 of FIGS. 3 and 4) of the display 320 to sense a touch of a user. For another example, the antenna structure 542 may be disposed on the side surface portion 324 and the front surface 328 of the display 320. In an embodiment, the touch sensor and the antenna structure 542 may be configured on the dielectric layer 540.

Figure 7A:
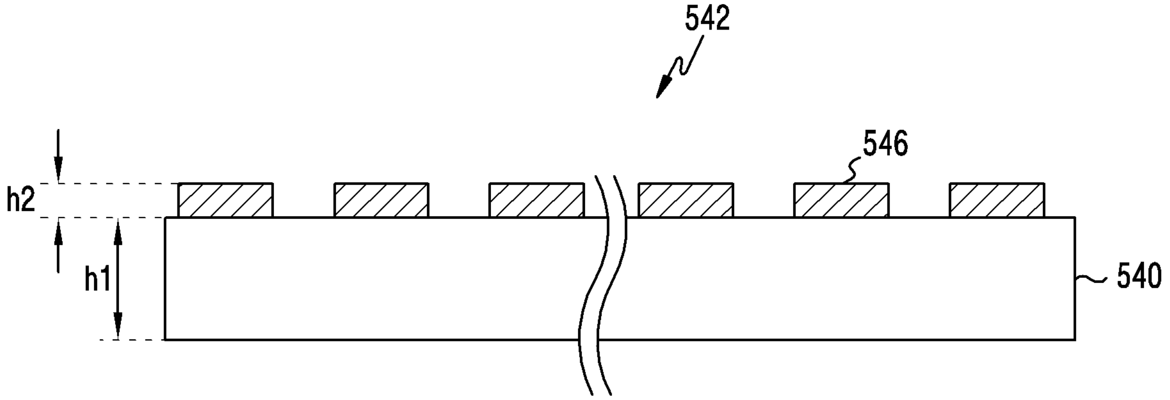
FIG. 7A illustrates a dielectric layer of an electronic device according to an embodiment of the disclosure.

In yet another embodiment, the dielectric layer 540 includes at least one of the conductive mesh line (e.g., the conductive mesh line 546 of FIG. 7A) or the dielectric (e.g., a dielectric 542 of FIG. 7A). A conductive mesh pattern (e.g., the conductive mesh pattern 822 of FIG. 8B) may be configured on the dielectric layer 540. For example, the conductive mesh pattern 822 is configured by a plurality of conductive mesh lines (e.g., the conductive mesh line 546 of FIG. 7A and FIG. 8B). In an embodiment, at least one of the touch pattern (e.g., the touch pattern 810 of FIG. 8A) or the antenna pattern (e.g., the antenna pattern 820 of FIG. 8A) is configured by using the plurality of conductive mesh lines 546.

According to yet another embodiment, the display 320 may include the first area (e.g., the front surface 328), a second area (A) 501, a third area (B) 502, or the fourth area (D) 504. The first area may correspond to the front surface 328 of the display 320. The second area (A) 501 and the third area (B) 502 may correspond to the side surface portion 324 of the display 320. The fourth area (D) 504 may include a feed area (C) 503. The second area (A) 501, the third area (B) 502, and the fourth area (D) 504 may be disposed on the side surface of the display 320. The fourth area (D) 504 is a transmission area, and the FPCB 570 may be disposed in the fourth area. In an embodiment, at least a part of the first area (e.g., the front surface 328), the second area (A) 501, the third area (B) 502, and the feed area (C) 503 may display a screen (e.g., display area).

For example, the antenna structure 542 is disposed on the side surface (e.g., the side surface portion 324 of FIGS. 3 and 4) of the display 320. The antenna surface 542 may be disposed at substantially the same height as an extension 511 of the upper surface of the display panel 510, or disposed to be lower than the extension 511 of the upper surface of the display panel 510.

In yet another embodiment, the antenna structure 542 includes at least one monopole antenna (e.g., a first antenna 710 of FIG. 7B), at least one dipole antenna (e.g., a second antenna 720 of FIG. 7B), at least one parallel plate wave-guide antenna (hereinafter, refer to parallel antenna) (e.g., a third antenna 730 of FIG. 7B), and/or at least one tapered slot antenna (e.g., a fourth antenna 740 of FIG. 7B). For example, the first antenna 710 (e.g., monopole antenna) or the third antenna 730 (e.g., parallel antenna) has a vertical polarization characteristic. In another embodiment, the second antenna 720 (e.g., dipole antenna) or the fourth antenna 740 (e.g., tapered slot antenna) may have a horizontal polarization characteristic.

In yet another embodiment, in case that the antenna structure 542 includes the parallel antenna (e.g., the third antenna 730 of FIG. 7B), the antenna structure 542 may emit radio waves having a horizontal polarization characteristic in a direction toward the front surface 328 of the electronic device, for example, a direction in which the display 320 is oriented (e.g., +Y-axis direction). In an embodiment, in case that the antenna structure 542 includes a dipole antenna (e.g., the second antenna 720 of FIG. 7B), a display ground or a shielding layer included in the display 320 may become a rear surface reflection plate. The dipole antenna may emit radio waves in a side surface direction of the electronic device (e.g., the electronic device 101 of FIGS. 3 and 4) (e.g., —X-axis, X-axis direction of FIGS. 3 and 4). The dipole antenna may emit radio waves having a horizontal polarization characteristic in the side surface direction.

In yet another embodiment, in case that a feeding line (e.g., a feeding line 840 of FIG. 8A) of the antenna (e.g., the first to fourth antennas 710, 720, 730, 740 of FIG. 7B) configured on the dielectric layer 540 may be disposed on the side surface portion (e.g., the side surface portion 324 of FIGS. 3 and 4) of the display 320, the FPCB 570 may be disposed adjacent to the side surface portion 324 of the display 320. The FPCB 570 may be electrically connected to the antenna. For example, in case of a plurality of antennas, the FPCB 570 includes a plurality of lines (e.g., first lines L1 and second lines L2 of FIG. 7B) for connecting the antennas and the antenna module (e.g., the antenna module 750 of FIG. 7B).

In yet another embodiment, a touch display driver IC (TDDIC) may be mounted in the FPCB 570. The FPCB 570 may be electrically connected to the dielectric layer 540. As an embodiment, a protection film or an optical compensation film may be disposed on the window 560.

Figure 6A:
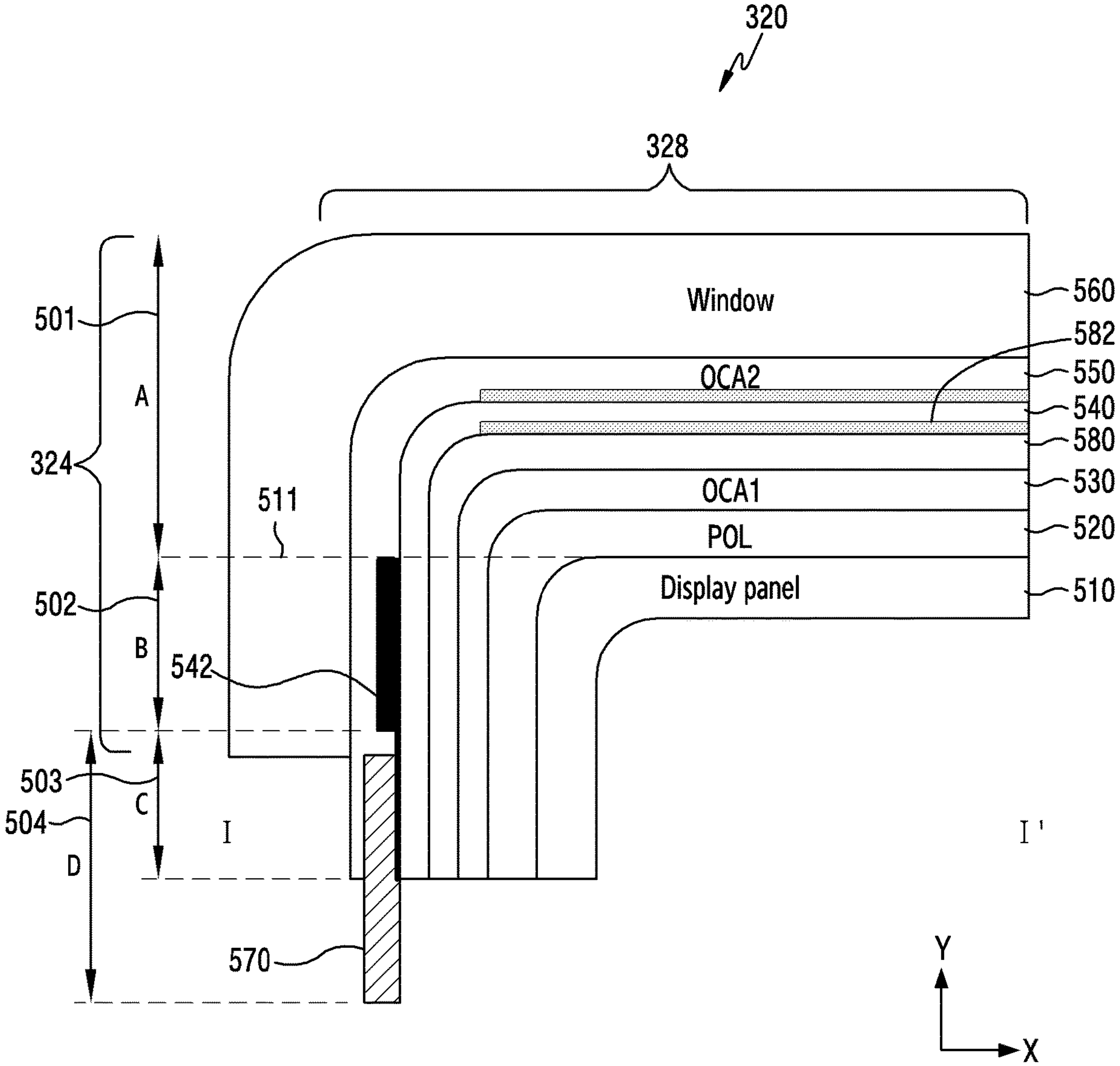
FIG. 6A is a cross-sectional view of the electronic device illustrated in FIG. 3 taken along line I-I' according to an embodiment of the disclosure.

FIG. 6A is a cross-sectional view of the electronic device illustrated in FIG. 3 taken along line I-I' according to an embodiment of the disclosure.

Figure 6B:
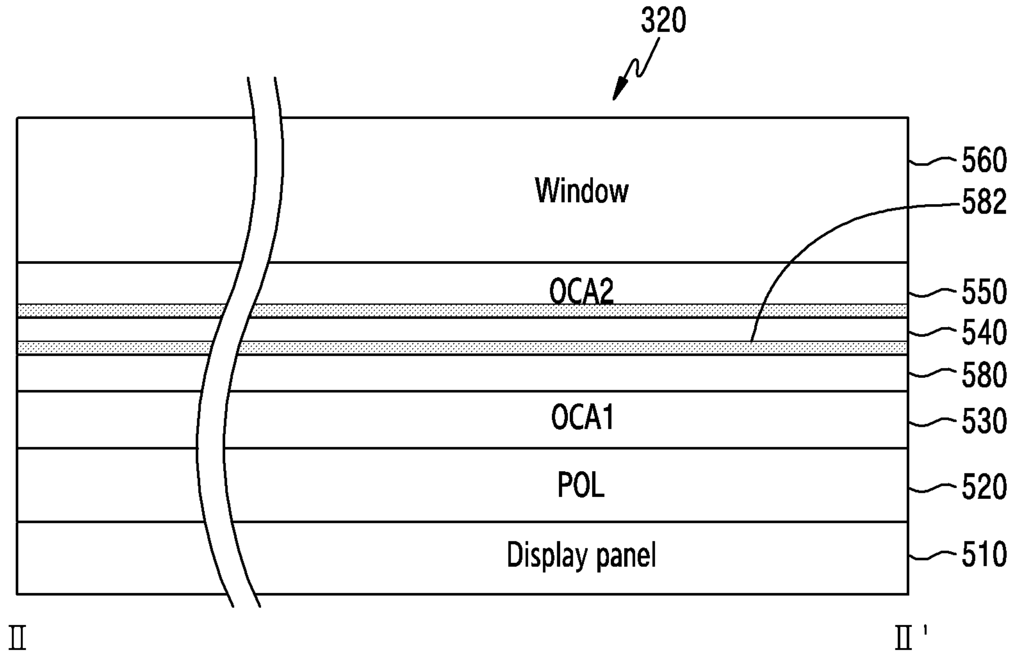
FIG. 6B is a cross-sectional view of the electronic device illustrated in FIG. 3 taken along line II-IF according to an embodiment of the disclosure.

FIG. 6B is a cross-sectional view of the electronic device illustrated in FIG. 3 taken along line II-IF according to an embodiment of the disclosure. In describing the display 320 of FIG. 6A, the description for the component substantially equal to the display 320 of FIG. 5A may be omitted.

Referring to FIGS. 6A and 6B, the display 320 includes at least one of the display panel 510, the polarizing layer 520, the first adhesive member (optical clear adhesive, OCA) 530, the dielectric layer 540, the second adhesive member 550, the window (e.g., Ultra-Thin Glass (UTG)) 560 or a polymer (e.g., polyethylene terephthalate (PET) window), or a touch layer 580. In an embodiment, the flexible printed circuit board (FPCB) 570 may be electrically connected to the display 320.

In another embodiment, the display 320 may be configured to allow the side surface portion (e.g., the side surface portion 324 of FIGS. 3 and 4) to have curvature. A touch sensor 582 may be disposed on the front surface (e.g., the surface on which a screen is displayed, the surface oriented in the +Y-axis direction, the front surface 328 of FIG. 4) and the side surface portion (e.g., the side surface portion 324 of FIGS. 3 and 4) of the display 320 to sense a touch of a user. For another example, the antenna structure 542 is disposed on the side surface portion (e.g., the side surface portion 324 of FIGS. 3 and 4) of the display 320. The antenna structure 542 may be configured on the dielectric layer 540. According to an embodiment, the antenna surface 542 may be disposed at substantially the same height as the extension 511 of the upper surface of the display panel 510, or disposed to be lower than the extension 511 of the upper surface of the display panel 510.

In an embodiment, the dielectric layer 540 includes at least one of the conductive mesh line (e.g., the conductive mesh line 546 of FIG. 7A) or the dielectric. The conductive mesh pattern (e.g., the conductive mesh pattern 822 of FIG. 8B) may be configured on the dielectric layer 540. For example, the conductive mesh pattern 822 is configured by a plurality of conductive mesh lines (e.g., the conductive mesh line 546 of FIG. 7A). In an embodiment, the antenna pattern (e.g., the antenna pattern 820 of FIG. 8A) may be configured by using the plurality of conductive mesh lines 546.

In yet another embodiment, the touch layer 580 is disposed between a dielectric layer 540 and a first adhesive member 530. The touch sensor 582 may be disposed on the touch layer 580. The touch sensor 582 may be configured as a plurality of touch patterns (e.g., the touch pattern 810 of FIG. 8A). In another embodiment, the touch layer 580 may include the conductive mesh line (e.g., the conductive mesh line 546 of FIG. 7A). In still another embodiment, the conductive mesh pattern (e.g., the conductive mesh pattern 822 of FIG. 8B) is configured on the touch layer 580. For example, the conductive mesh pattern 822 is configured by the plurality of conductive mesh lines 546. In an embodiment, the touch pattern (e.g., the touch pattern 810 of FIG. 8A) may be configured by using the plurality of conductive mesh lines 546. FIG. 6A illustrates that the touch layer 580 is disposed beneath the dielectric layer 540, but the locations of the touch layer 580 and the dielectric layer 540 may be switched. The dielectric layer 540 may be disposed beneath the touch layer 580. According to an embodiment, in case of implementing the touch pattern (e.g., the touch pattern 810 of FIG. 8A) by using a plurality of conductive mesh lines configured on the dielectric layer 540, the touch layer 580 may be omitted.

FIG. 7A illustrates a cross-section of the dielectric layer of an electronic device according to an embodiment of the disclosure. In an embodiment, the touch layer of FIG. 6A may be substantially equal to the dielectric layer.

Referring to FIG. 7A, the dielectric layer 540 may include the dielectric and the conductive mesh line 546. In another embodiment, the conductive mesh line 546 may be disposed on the dielectric layer 540. In another embodiment, the conductive mesh line 546 may be disposed inside the dielectric layer 540. For example, the dielectric layer 540 has a thickness h1 of about 40 μm. The conductive mesh line 546 may be made of a conductive material having high conductivity (e.g., silver (Ag), silver-alloy (Ag-alloy), aluminum (Al), aluminum-alloy (Al-alloy), copper (Cu), or copper-alloy (Cu-alloy)). The conductive mesh line 546 has a thickness h2 of about 0.2-0.3 μm. In yet another embodiment, at least one of the touch pattern (e.g., the touch pattern 810 or the antenna pattern 820 of FIG. 8A) is configured by the conductive mesh line 546. The conductive mesh line 546 is expressed in the singular, but the dielectric layer 540 may include a plurality of conductive mesh lines 546.

Figure 7B:
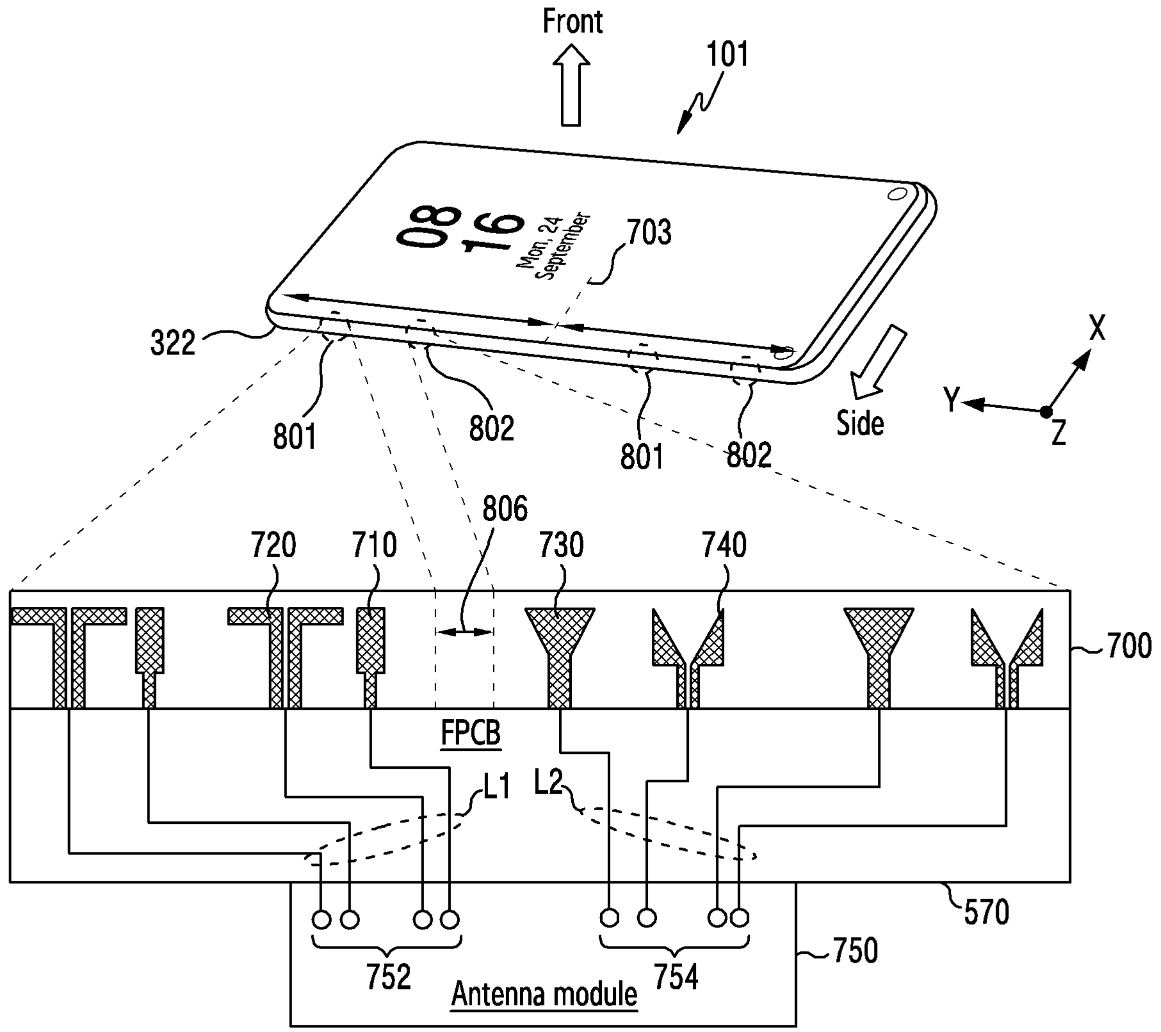
FIG. 7B illustrates an antenna structure disposed on a side surface portion of an electronic device according to an embodiment of the disclosure.

FIG. 7B illustrates an antenna structure disposed on a side surface portion of an electronic device according to an embodiment of the disclosure.

Referring to FIGS. 3, 5A, and 7B, the antenna structure 700 (e.g., the antenna structure 542 of FIGS. 3 and 5A) may be disposed on the side surface portion 324 of the electronic device 101. The antenna structure 700 includes at least one of at least one first type antenna (e.g., side surface radiation antenna) or at least one second type antenna (e.g., front surface radiation antenna). The antenna structure 700 may have a vertical polarization and a horizontal polarization characteristic by including the at least one first type antenna and the at least one second type antenna.

In yet another embodiment, the antenna structure 700 may include the first area 801 and the second area 802. For example, the first area 801 and the second area 802 of the antenna structure 700 are alternately disposed in the side surface portion 324. However, it is not limited thereto, and the first area 801 and the second area 802 of the antenna structure 700 may be configured to be spaced apart from each other. For example, the first area 801 of the antenna structure 700 is disposed on the upper side in the Y-axis direction with reference to a center portion 703 of the side surface portion 324. For another example, the first area 801 of the antenna structure 700 may be disposed on the lower side in the Y-axis direction with reference to the center portion 703 of the side surface portion 324. For another example, the second area 802 of the antenna structure 700 may be disposed on the upper side in the Y-axis direction with reference to the center portion 703 of the side surface portion 324. For another example, the second area 802 of the antenna structure 700 may be disposed in the —Y-axis direction with reference to the center portion 703 of the side surface portion 324. The first area 801 and the second area 802 of the antenna structure 700 may be disposed to be spaced a predetermined distance 806 apart from each other.

According to yet another embodiment, in order to improve an antenna gain of a millimeter wave (mmWave) frequency band, an antenna structure 700 may include an array antenna including a plurality of antennas. A first area 801 of the antenna structure 700 may include a plurality of the first antennas 710 (e.g., monopole antenna) which can emit a signal into the side surface of the electronic device 101. The first area 801 of the antenna structure 700 may include a plurality of the second antennas 720 (e.g., dipole antenna) which can emit a signal into the side surface of the electronic device 101. For example, the plurality of the first antennas 710 (e.g., monopole antenna) and the plurality of the second antennas 720 (e.g., dipole antenna) are alternately disposed to configure at least one antenna array.

In yet another embodiment, a second area 802 of an antenna structure 700 may include a plurality of third antennas 730 (e.g., parallel antenna). A second area 802 of the antenna structure 700 may include a plurality of fourth antennas 740 (e.g., tapered slot antenna). For example, the plurality of third antennas 730 (e.g., parallel antenna) and the plurality of fourth antennas 740 (e.g., tapered slot antenna) are alternately disposed to configure at least one antenna array.

In yet another embodiment, a plurality of first antennas 710 (e.g., monopole antenna) and a plurality of second antennas 720 (e.g., dipole antenna) may be electrically connected to an antenna module 750 or a wireless communication circuit (e.g., the second CP 214 of FIG. 2) through a FPCB 570. A plurality of third antennas 730 (e.g., parallel antenna) and a plurality of fourth antennas 740 (e.g., tapered slot antenna) may be electrically connected to the antenna module 750 or a wireless communication circuit (e.g., the second CP 214 of FIG. 2) through the FPCB 570. The FPCB 570 may be electrically connected to the antenna module 750.

In yet another embodiment, the antenna structure 700 and the antenna module 750 may be electrically connected through the FPCB 570. The FPCB 570 may include a plurality of first lines L1 for connecting the plurality of first antennas 710 (e.g., monopole antenna) and the plurality of second antennas 720 (e.g., dipole antenna) with the antenna module 750. The FPCB 570 may include the plurality of second lines L2 for connecting the plurality of third antennas 730 (e.g., parallel antenna) and the plurality of fourth antennas 740 (e.g., tapered slot antenna) with the antenna module 750. For example, the plurality of the first lines L1 are connected to the plurality of the first antenna terminals 752 of the antenna module 750, and the plurality of second lines L2 may be connected to the plurality of second antenna terminals 754 of the antenna module 750.

In yet another embodiment, the antenna module 750 may be electrically connected to the first type antenna (e.g., side surface radiation antenna) and at least one second type antenna (e.g., front surface radiation antenna) to feed the signal. For example, the antenna module 750 is implement a beamforming function by using the first type antenna (e.g., side surface radiation antenna) and at least one second type antenna (e.g., front surface radiation antenna).

FIG. 8A illustrates the touch pattern and the antenna pattern of an electronic device (e.g., the electronic device of FIG. 1) according to an embodiment of the disclosure.

Figure 8B:
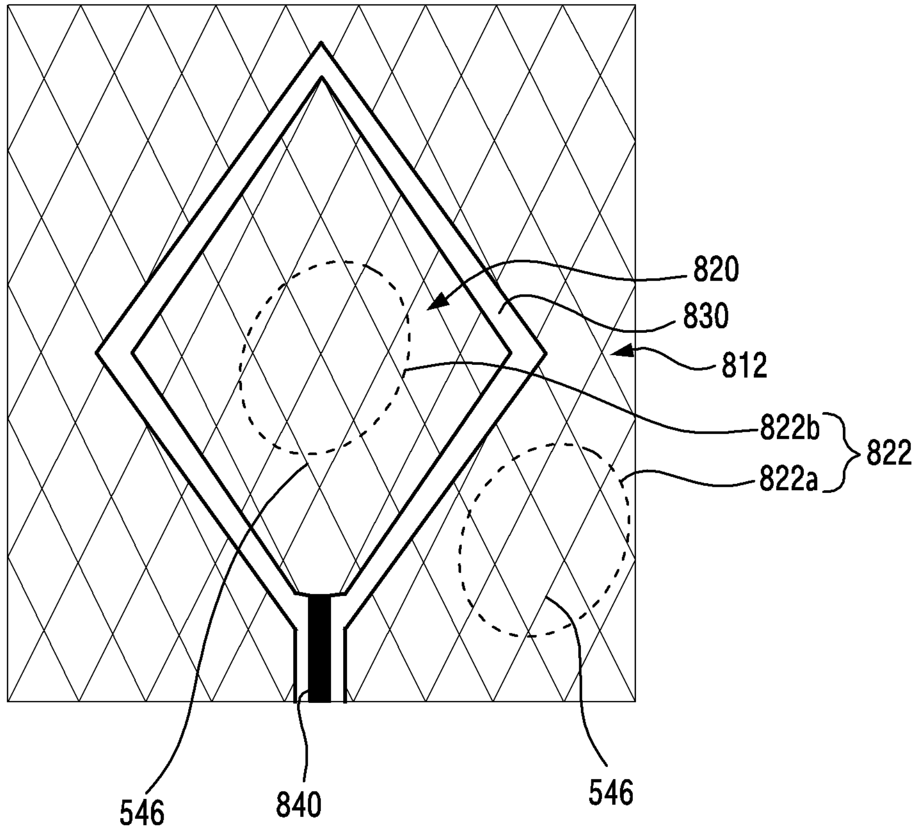
FIG. 8B illustrates an example of configuring an antenna pattern by patterning a conductive mesh line according to an embodiment of the disclosure.

FIG. 8B illustrates an example of configuring the antenna pattern by patterning the conductive mesh line according to an embodiment of the disclosure.

Referring to FIGS. 7A, 8A, and 8B, the conductive mesh pattern 822 is configured by using the conductive mesh line 545 included in the dielectric layer 540, and at least one of the touch pattern (e.g., the touch pattern 810 of FIG. 8A) or the antenna pattern (e.g., the antenna pattern 820 of FIG. 8A) is configured by segmenting the conductive mesh pattern 822. A segment portion 830 may be configured between the touch pattern 810 and the antenna pattern 820, so that the touch pattern 810 and the antenna pattern 820 may be electrically segmented.

According to an embodiment, the feeding line 840 of an antenna pattern (e.g., the antenna pattern 820 of FIG. 8A) configured on the dielectric layer 540 may be electrically connected to the FPCB 570. For example, at least a part of the feeding line 840 is disposed at an area on which a screen of the display 320 is displayed. The FPCB (e.g., the FPCB 570 of FIG. 5A) may be disposed at the area on which a screen of the display 320 is not displayed. The FPCB 570 may be electrically connected to a wireless communication circuit (e.g., the third RFIC 226 of FIG. 2).

Referring to FIGS. 3 and 4, the first area 330 may include a first conductive mesh pattern 822*a* for performing a touch function and a second conductive mesh pattern 822*b* for performing an antenna function. The touch pattern 810 may be configured by the first conductive mesh pattern 822*a* disposed on the first area 330. The antenna pattern 820 may be configured by the second conductive mesh pattern 822*b* disposed on the first area 330. The second area 340 may include the first conductive mesh pattern 822*a* for performing a touch function. The touch pattern 810 may be configured by the first conductive mesh pattern 822*a* disposed on the second area 340. In an embodiment, the touch pattern 810 and the fingerprint sensor (e.g., the sensor module 176 of FIG. 1) may be disposed on the second area 340. In another embodiment, the fingerprint sensor may be applied to an entire area of the display 320. In an embodiment, the third area 350 may include the first conductive mesh pattern 822*a* for performing the touch function. The touch pattern 810 may be configured by the first conductive mesh pattern 822*a* disposed on the third area 350.

In another embodiment, the second area 340 may include an entire area of the display 320. For example, the second area 340 may include the entire area on which a screen of the display 320 is displayed. In an embodiment, in case that the second area 340 includes the whole of the display 320, the touch pattern 810 and at least one sensor (the sensor module 176 of FIG. 1) (e.g., the fingerprint sensor, the iris sensor, or the illuminance sensor) may be disposed to correspond to the whole of the display 320. For example, at least one sensor is disposed on or beneath the display panel (e.g., the display panel 510 of FIGS. 5A and 5B).

In yet another embodiment, as illustrated in FIG. 8B, the first conductive mesh pattern 822*a* for performing the touch function included in the first area (e.g., the first area 330 of FIGS. 3 and 4) and the second conductive mesh pattern 822*b* for performing the antenna function may have a shape of at least one of a rhombus, a shape of a rhombus having the longer length in the first direction (e.g., Y-axis direction), a shape of a hexagon, or a shape of a hexagon having the longer length in the first direction (e.g., Y-axis direction). In another embodiment, the shape of the conductive mesh pattern 822 may vary according to a location in which the conductive mesh pattern 822 is disposed in the display 320.

In yet another embodiment, the shape of the first conductive mesh pattern 822*a* of the touch pattern 810 configured on at least one of a first area 330, a second area 340, or a third area 350 may be diverse. In another embodiment, the shape of the second conductive mesh pattern 822*b* of the antenna pattern 820 configured on at least one of a first area 330, a second area 340, or a third area 350 may be diverse.

Referring to FIG. 8A, the plurality of touch patterns 810 may include a plurality of transmission patterns 812 (Tx) and a plurality of reception patterns 814 (Rx). The plurality of transmission patterns 812 may be directly and electrically connected, and the plurality of reception patterns 814 may be electrically connected to each other through a bridge structure 860 of FIG. 8D.

Figure 8C:
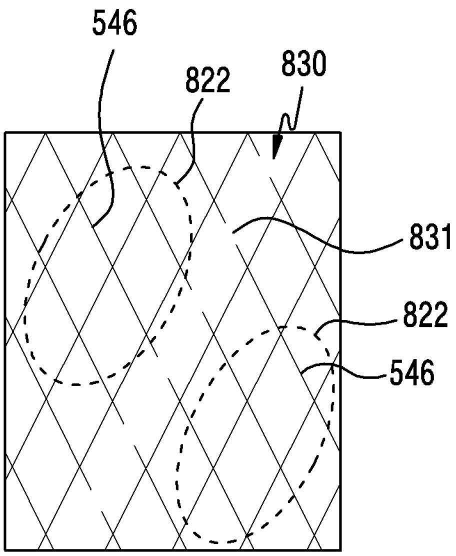
FIG. 8C illustrates an example in which a segment portion is configured by a single gap or a double gap according to an embodiment of the disclosure.
Figure 8C:
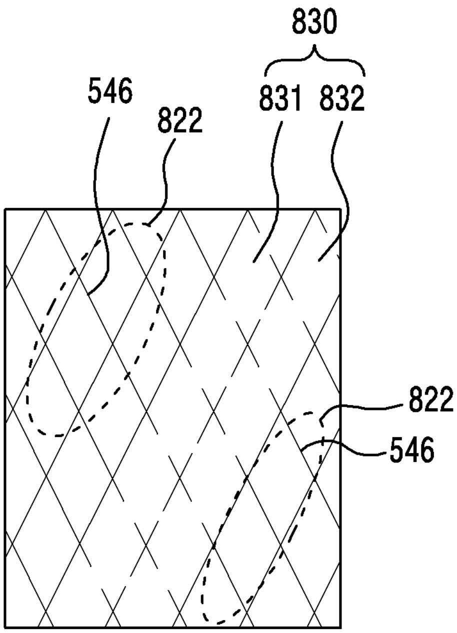
Figure 8D:
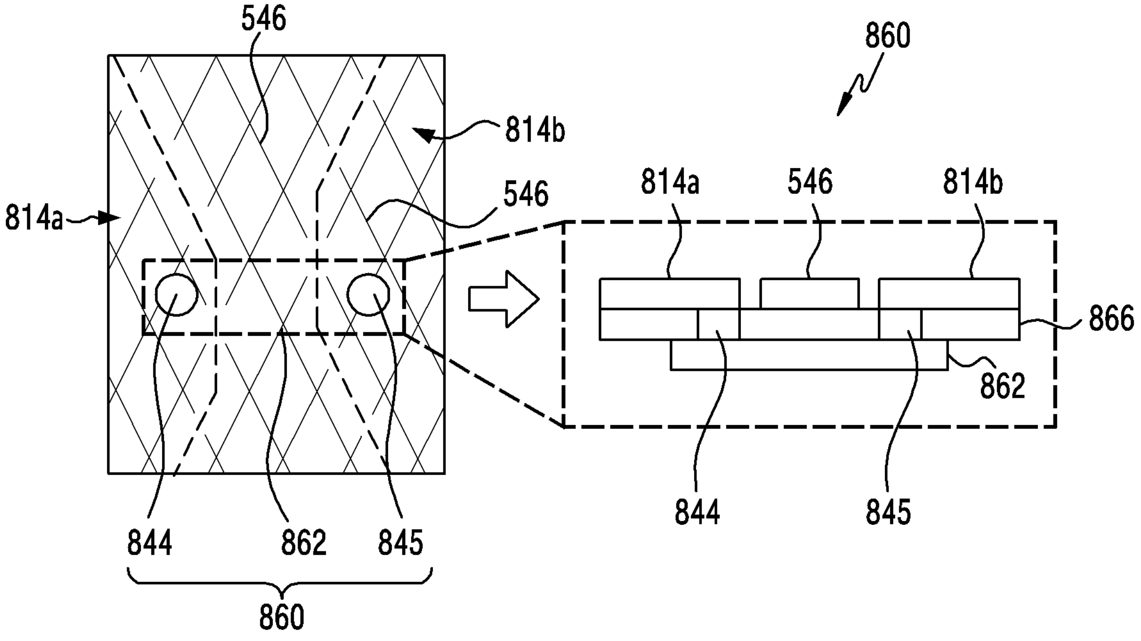
FIG. 8D illustrates an example of a bridge structure for connecting touch patterns (e.g., reception patterns) according to an embodiment of the disclosure.

FIG. 8C illustrates an example in which the segment portion is configured by a single gap or a double gap according to an embodiment of the disclosure. FIG. 8D illustrates an example of a bridge structure for connecting touch patterns (e.g., reception patterns) according to an embodiment of the disclosure.

Referring to FIGS. 3 and 8A to 8D, the antenna pattern 820 may be configured by using the second conductive mesh pattern 822*b* configured on the first area 330 of the electronic device 101. The segment portion 830 may be configured between the touch pattern 810 and the antenna pattern 820, so that the touch pattern 810 and the antenna pattern 820 may be electrically segmented.

The conductive mesh line (e.g., the conductive mesh line 546 of FIG. 7A) may be disposed on one surface (e.g., surface on which a screen is displayed) of the display panel 510, and the conductive mesh pattern 822 for configuring the touch pattern 810 is configured by patterning the conductive mesh line 546. In an embodiment, the antenna pattern 820 may be configured in a part of at least one of the reception pattern 814 or the transmission pattern 812. For example, the first conductive mesh pattern 822*a* configured in at least one of a part of the reception pattern 814 or a part of the transmission pattern 812 is segmented to configure the antenna pattern 820 by the second conductive mesh pattern 822*b*. For example, the second conductive mesh pattern 822*b* is included in the antenna pattern 820. The segment portion 830 may be configured between the first conductive mesh pattern 822*a* and the second conductive mesh pattern 822*b*. The touch pattern 810 and the antenna pattern 820 may be segmented by the segment portion 830. For example, the first conductive mesh pattern 822*a* and the second conductive mesh pattern 822*b* has substantially the same shape.

Referring to FIG. 8D, a first reception pattern 814*a* and a second reception pattern 814*b*, which are adjacent to each other, may be electrically connected through the bridge structure 860. The bridge structure 860 may include a bridge line 862, a first contact 844, a second contact 845, and an insulating layer 866. For example, the insulating layer 866 is included in the dielectric layer. The first reception pattern 814*a* and the second reception pattern 814*b* and the bridge line 862 are spaced apart from each other with the insulating layer 866 interposed therebetween. The first reception pattern 814*a* and the bridge line 862 may be electrically connected through the first contact 844, and the second reception pattern 814*b* and the bridge line 862 may be electrically connected through the second contact 845. Therefore, the first reception pattern 814*a* and the second reception pattern 814*b*, which are adjacent to each other, may be electrically connected.

FIG. 8A illustrates the antenna pattern disposed to be included in one transmission pattern. However, it is not limited thereto, and the antenna pattern 820 may be disposed to be included in one reception pattern 814.

FIG. 8A illustrates an example in which the plurality of touch patterns and antenna patterns are disposed to have a shape of a rhombus. However, it is not limited thereto, and the shape of the plurality of the touch patterns 810 and the antenna pattern 820 may vary. In an embodiment, the conductive mesh pattern 822 may be configured in a shape of a square or a rhombus in which the lengths of four sides are equal to each other, a shape of a polygon or a circle as well as the square.

Figure 9:
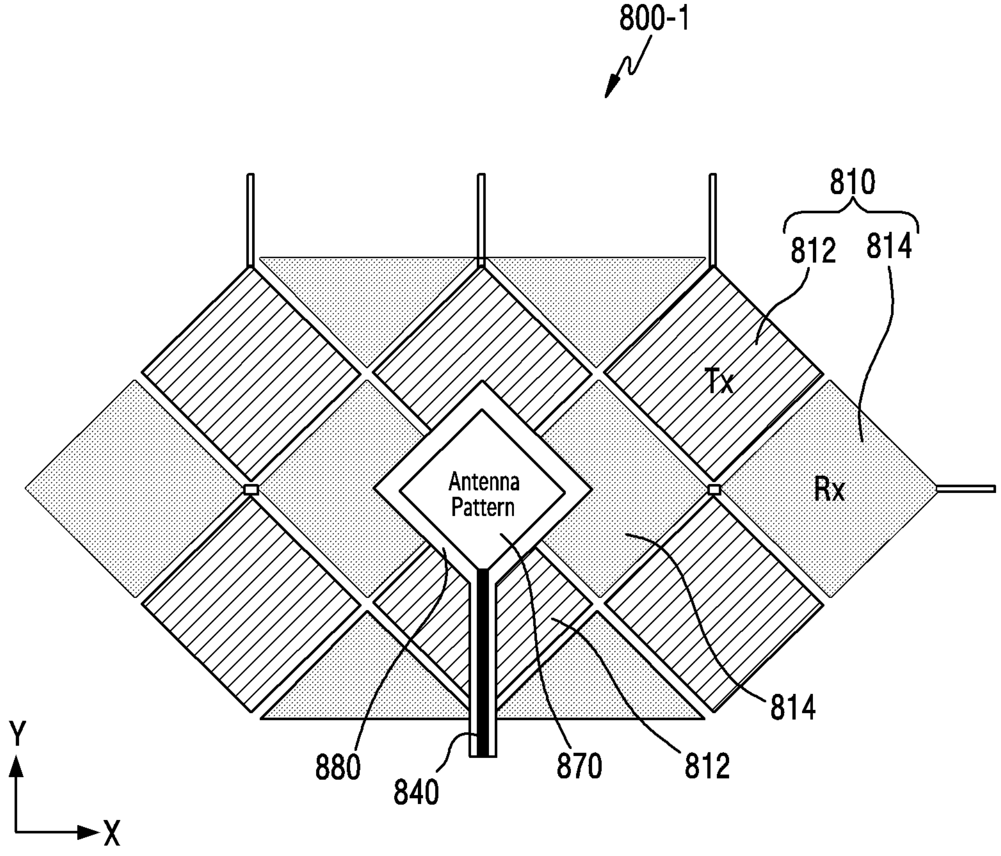
FIG. 9 illustrates a touch pattern and an antenna pattern of an electronic device according to an embodiment of the disclosure.

FIG. 9 illustrates the touch pattern and an antenna pattern of an electronic device according to an embodiment of the disclosure.

Referring to FIG. 9, the plurality of touch patterns 810 may include a plurality of transmission patterns (Tx) 812 and a plurality of reception patterns (Rx) 814. The plurality of transmission patterns 812 may be directly and electrically connected, and the plurality of reception patterns 814 may be electrically connected through the bridge structure (e.g., the bridge structure 860 of FIG. 8D). A segment portion 880 is configured between the touch pattern 810 and the antenna pattern 870, so that the touch pattern 810 and the antenna pattern 870 may be electrically segmented.

In an embodiment, the antenna pattern 870 may be disposed to overlap the plurality of transmission patterns 812 and the plurality of reception patterns 814. For example, a first conductive mesh pattern 822 of at least one of a plurality of reception patterns 814 or a plurality of transmission patterns 812 is segmented to configure the antenna pattern 870. The first conductive mesh pattern 822 configured in at least one of a part of the reception pattern 814 or a part of the transmission pattern 812 may be segmented to configure the antenna pattern 870. The touch pattern 810 and the antenna pattern 870 may be segmented by the segment portion 880. As illustrated in FIG. 8C, the segment portion 880 (e.g., the segment portion 830 of FIG. 8C) may be configured by a single gap 831 method or double gap 831, 832 methods. FIG. 9 illustrates an example in which one antenna pattern is configured to overlap two reception patterns and two transmission patterns 812. However, it is not limited thereto, and the number of the reception pattern 814 and the transmission pattern 812 overlapping one antenna pattern 870 may vary.

In another embodiment, the second conductive mesh pattern **822*b* (e.g., a conductive mesh pattern 1010 of FIG. 10) included in the antenna pattern 870 may be configured in a shape of a rhombus. For example, the antenna pattern 870 (e.g., the antenna pattern 820 of FIG. 8A) is configured by the plurality of second conductive mesh patterns 822*b* (e.g., the conductive mesh pattern 1010 of FIG. 10) in the shape of the rhombus. For another example, the first conductive mesh pattern 822 (e.g., the conductive mesh pattern 1010 of FIG. 10) configuring the touch pattern 810 may be configured in a shape of a rhombus. For example, the touch pattern 810 (e.g., the touch pattern 810 of FIG. 8A) is configured by the plurality of second conductive mesh patterns 822*b*** in a shape of a rhombus.

In yet another embodiment, in case that the antenna pattern 870 is configured to overlap the plurality of the touch patterns 810, a part of the plurality of touch patterns 810 may not be electrically connected, and thus may not be operated as the touch sensor. For example, the transmission patterns 812 overlapping the antenna pattern 870 is not electrically connected and the reception pattern 814 overlapping the antenna pattern 870 may not be electrically connected, and thus may not be operated by the touch sensor.

Figure 10:
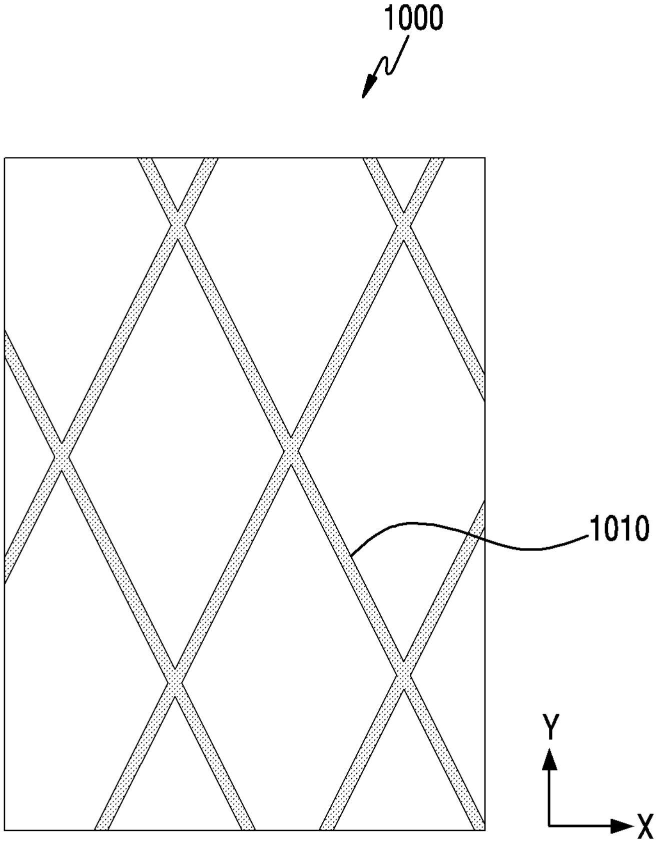
FIG. 10 illustrates an example of a shape of a conductive mesh pattern configuring a touch pattern and an antenna pattern according to an embodiment of the disclosure.
Figure 11:
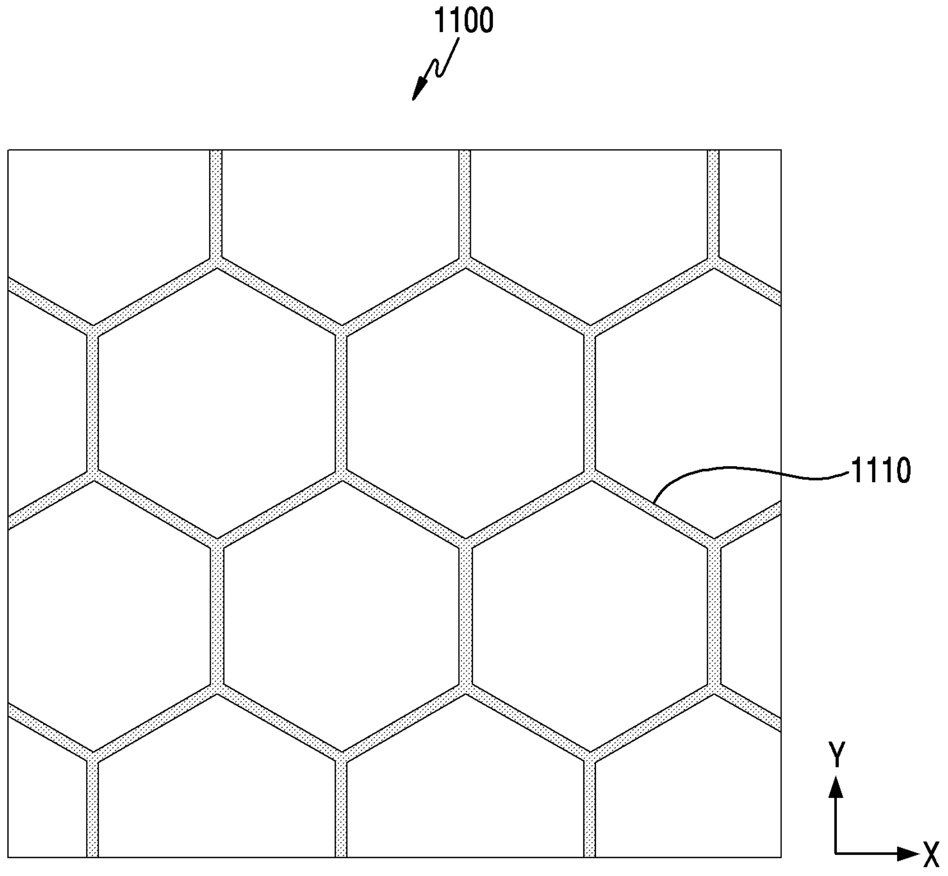
FIG. 11 illustrates an example of a shape of a conductive mesh pattern configuring a touch pattern and an antenna pattern according to an embodiment of the disclosure.
Figure 12:
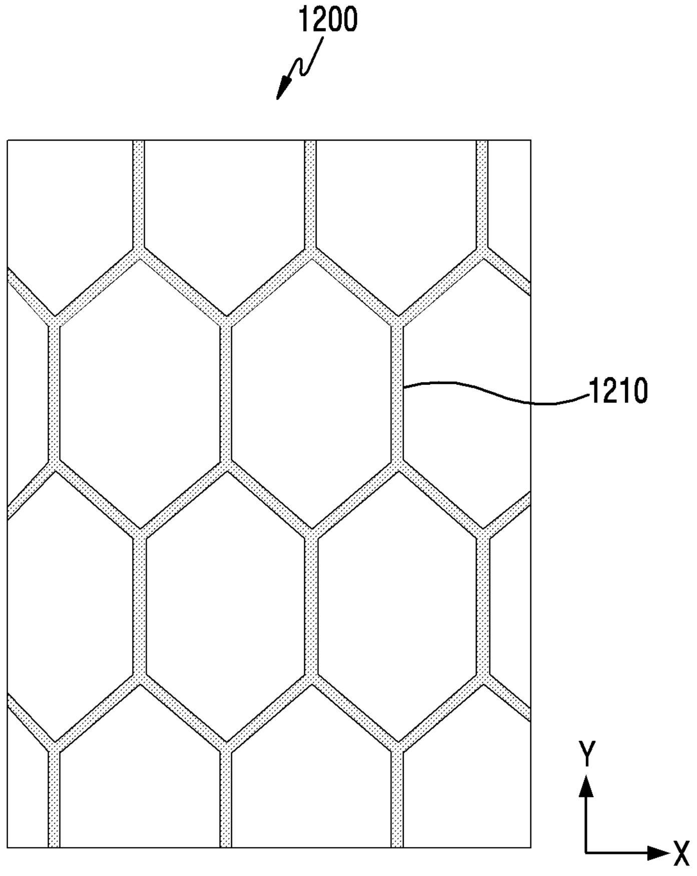
FIG. 12 illustrates an example of a shape of a conductive mesh pattern configuring a touch pattern and an antenna pattern according to an embodiment of the disclosure.

FIGS. 10, 11, and 12 illustrate an example of a shape of a conductive mesh pattern (e.g., the first conductive mesh pattern **822*a* or the second conductive mesh pattern 822*b* of FIGS. 8B and 8C) included in the touch pattern (e.g., the touch pattern 810 of FIG. 8A) and the antenna pattern (e.g., the antenna pattern 820 of FIG. 8**A) according to various embodiments of the disclosure.

Referring to FIG. 10, the conductive mesh pattern 1010 (e.g., the first conductive mesh pattern **822*a* or the second conductive mesh pattern 822*b* of FIGS. 8B and 8C) included in an antenna pattern 1000 may be configured in a shape of a rhombus having the longer length in the first direction (e.g., Y-axis direction). For example, the conductive mesh pattern 1010 having the shape of the rhombus, in which a current direction of the antenna pattern 1000** is configured as a first diagonal (e.g., the first direction, Y-axis direction) and which includes a second diagonal (e.g., the second direction, X-axis direction) orthogonal to the first diagonal (e.g., the first direction, Y-axis direction) and shorter than the first diagonal, may be included.

Referring to FIG. 11, a conductive mesh pattern 1110 (e.g., the first conductive mesh pattern **822*a* or the second conductive mesh pattern 822*b* of FIGS. 8B and 8C) included in an antenna pattern 1100 (e.g., the touch pattern 810 and the antenna pattern 820**) may be configured in a shape of a regular hexagon.

Referring to FIG. 12, a conductive mesh pattern 1210 (e.g., the first conductive mesh pattern **822*a* or the second conductive mesh pattern 822*b* of FIGS. 8B and 8C) included in an antenna pattern 1200 (e.g., the touch pattern 810 and the antenna pattern 820) may be configured in a shape of a hexagon having the longer length in the vertical direction (e.g., Y-axis direction). For example, the conductive mesh pattern 1210 having the shape of the hexagon, in which a current direction of the antenna pattern 1200 is configured as a first diagonal (e.g., the first direction, Y-axis direction) and the length of the first diagonal (e.g., the first direction, Y-axis direction) is longer than the length of the other diagonals (e.g., the second direction, X-axis direction) are included in the antenna pattern 1200**.

However, it is not limited thereto, and the conductive mesh patterns 1010, 1110, 1210 may be configured in a shape of a rhombus having the longer length in the horizontal direction (e.g., X-axis direction), or a shape of a hexagon having the longer length in the second direction (e.g., X-axis direction), according to current directions of the antenna patterns 1000, 1100, 1200.

Figure 13A:
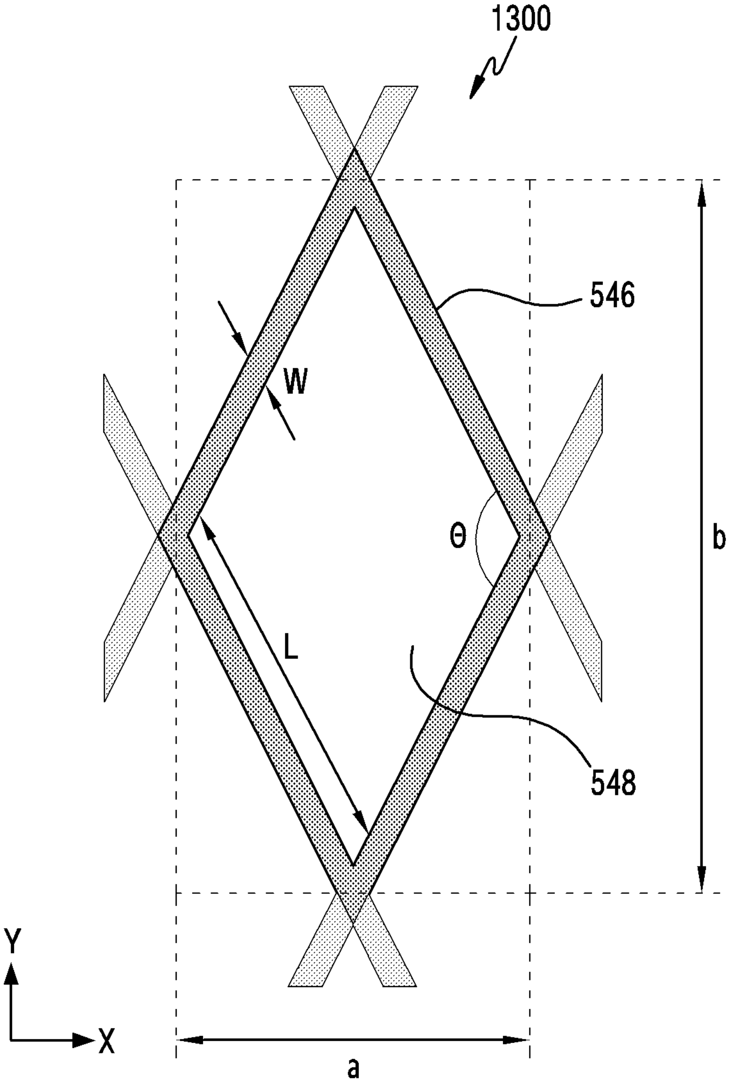
FIG. 13A illustrates antenna radiation efficiency according to an angle of a conductive mesh pattern according to an embodiment of the disclosure.

FIG. 13A illustrates antenna radiation efficiency according to an angle of a conductive mesh pattern 1300 (e.g., the antenna pattern 820) according to an embodiment of the disclosure.

Figure 13B:
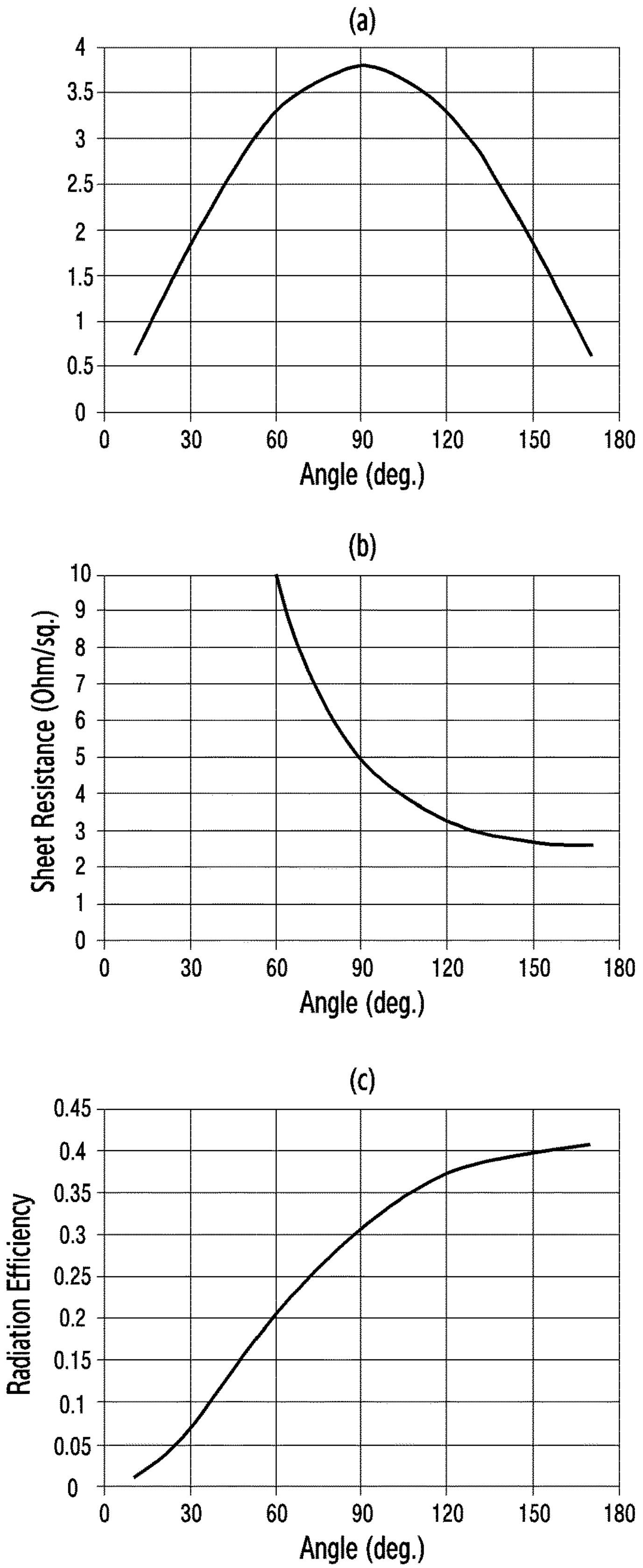
FIG. 13B illustrates a sheet resistance and a line width of a conductive mesh line according to a square inner angle of a conductive mesh pattern according to an embodiment of the disclosure.

FIG. 13B illustrates a sheet resistance and a line width of a conductive mesh line according to a square inner angle of the conductive mesh pattern 1300 according to an embodiment of the disclosure.

Referring to FIGS. 13A and 13B, radiation efficiency of the antenna (e.g., the antenna structure 542 of FIG. 5A) may vary according to the inner angle of the conductive mesh pattern 1300. The conductive mesh pattern 1300 may be configured to have the length b in the Y-axis direction longer than the length a in the X-axis direction. According to an embodiment, as the length b in the Y-axis direction which is a current direction of the conductive mesh pattern 1300 increases, the radiation efficiency of the antenna structure 542 may increase. According to another embodiment, among the entire area of the conductive mesh pattern 1300, the radiation efficiency of the antenna (e.g., the antenna disposed on the front surface 328 of the display 320 and the antenna structure 542 of FIG. 5A) may vary according to a ratio of an area in which the conductive mesh line 546 is configured and a ratio of the open area 548 in which the conductive mesh line 546 is not configured.

In order to reduce degradation of light transmittance of the display (e.g., the display 320 of FIG. 3) according to application of the conductive mesh pattern 1300, the conductive mesh pattern of a square structure may be applied. However, in the antenna (e.g., the antenna structure 542 of FIG. 5A), the sheet resistance value and the intersection angle of the conductive mesh pattern 1300 may be important. In an embodiment, when the conductive mesh pattern 1300 is the square structure, the conductive mesh line 546 may be implemented to have the largest line width W, but an important sheet resistance value for implementing an actual antenna may be reduced as the inner angle of the square increases. According to an embodiment of the disclosure, the conductive mesh pattern 1300 may apply the conductive mesh structure in which a current direction (e.g., Y-axis direction) in the antenna pattern (e.g., the antenna pattern 820 of FIG. 8A, the antenna pattern 1000 of FIG. 10) is in the first diagonal direction of a shape of a rhombus, based on the sheet resistance and the intersection angle of the conductive mesh pattern 1300.

According to yet another embodiment, a ratio of an open area 548 of the conductive mesh pattern 1300 may be obtained by equation 1 as follows.

$$\text{Open area ratio: } \frac{(L+W)^2\sin\theta - 2W(L+W)}{(L+W)^2\sin\theta} \quad \text{Equation 1}$$

In the equation 1, the "L" may indicate ½ of the length of the current direction (e.g., the first direction, Y-axis direction) of the conductive mesh line 546, and the "W" may indicate the line width of the conductive mesh line 546.

In yet another embodiment, the ratio of the area in which the conductive mesh line 546 is configured and the ratio of the open area 548 in which the conductive mesh line 546 is not configured may be obtained based on the equation 1. For example, in case that the ratio of the open area 548 is configured as 93%, L=104 mm.

Among the entire area of the conductive mesh pattern 1300, an area in which the conductive mesh line 546 is configured may be about 7%, and the open area 548 in which the conductive mesh line 546 is not configured may be about 93%. As noted from graph part (a) of FIG. 13B, the radiation efficiency of the antenna (e.g., the antenna structure 542 of FIG. 5A) is best when an area in which the conductive mesh line 546 is configured corresponds to about 7% of the entire area and the open area 548 in which the conductive mesh line 546 is not configured corresponds to about 93% thereof. According to an embodiment, the conductive mesh pattern 1300 may be configured so that the area in which the conductive mesh line 546 is configured corresponds to about 7%, and the open area 548 in which the conductive mesh line 546 is not configured corresponds to about 93%, among the entire area of the conductive mesh pattern 1300.

According to yet another embodiment, an effective sheet resistance $R_{s\_Effective}$ of the current direction (e.g., the first direction, Y-axis direction) of the conductive mesh pattern 1300 may be indicated as equation 2 below.

$$R_{s\_Effective} \approx R_S \times \frac{L}{W} \times \frac{a}{b} = R_S \times \frac{L}{W} \times \frac{L}{W} \times \cot\frac{\theta}{2} \quad \text{Equation 2}$$

As noted from graph part (b) of FIG. 13B, it may be identified that the effective sheet resistance decreases as the angle (θ) of the inner angle of the conductive mesh pattern 1300 increases.

According to yet another embodiment, the radiation efficiency of the antenna (e.g., the antenna structure 542 of FIG. 5A) may be indicated as Equation 3 below.

$$\text{Radiation efficiency: } \eta = \frac{R_{rad}}{R_{rad} + R_d + R_c} \quad \text{Equation 3}$$

In the Equation 3, the $R_{rad}$ may indicate radiation resistance, the Rd may indicate a dielectric loss, and the $R_c$ may indicate a metal loss (proportional to $R_{s\_Effective}$). As noted from graph part (c) of FIG. 13B, the radiation efficiency of the antenna (e.g., the antenna structure 542 of FIG. 5A) increases as an angle (θ) of an inner angle of the conductive mesh pattern 1300 increases.

As the length of the conductive mesh pattern 1300 increases in the vertical direction (e.g., Y-axis direction), the radiation efficiency of the antenna (e.g., the antenna structure 542 of FIG. 5A) increases. Therefore, according to an embodiment, the conductive mesh pattern 1300 may be configured in a shape of a rhombus or a hexagon having the longer length in the first direction (e.g., Y-axis direction).

In yet another embodiment, the length ratio of the first direction (e.g., Y-axis direction) and the second direction (e.g., X-axis direction) of the conductive mesh pattern 1300 illustrated in FIG. 13A may be configured as about 2:1. In another embodiment, the length ratio of the first direction (e.g., Y-axis direction) and the second direction (e.g., X-axis direction) of the conductive mesh pattern 1300 may be configured as about 1.5~about 1.95:1.0. In another embodiment, the length ratio of the first direction (e.g., Y-axis direction) and the second direction (e.g., X-axis direction) of the conductive mesh pattern 1300 may be configured as about 2.1~about 5.0:1.0.

In another embodiment, the length ratio of the second direction (e.g., X-axis direction) and the first direction (e.g., Y-axis direction) of the conductive mesh pattern (a conductive mesh pattern 1430 illustrated in FIG. 15) of a hexagon having the longer length in the first direction (e.g., Y-axis direction) may be configured as about 2:1. In an embodiment, the length ratio of the second direction (e.g., X-axis direction) and the first direction (e.g., Y-axis direction) of the conductive mesh pattern 1430 may be configured as about 1.5~about 1.95:1.0. In another embodiment, the length ratio of the second direction (e.g., X-axis direction) and the first direction (e.g., Y-axis direction) of the conductive mesh pattern 1430 may be configured as about 2.1~about 5.0:1.0.

Figure 14A:
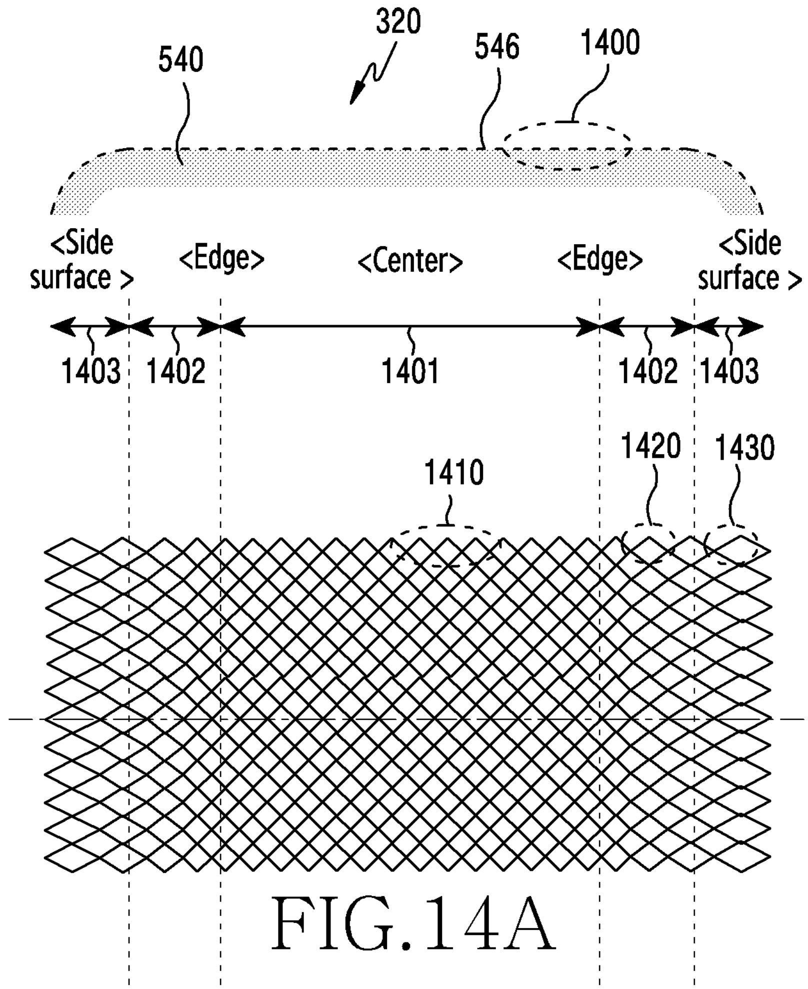
FIGS. 14A and 14B illustrate an example of improving visibility of a display by changing a shape of a conductive mesh pattern according to various embodiments of the disclosure.
Figure 14B:
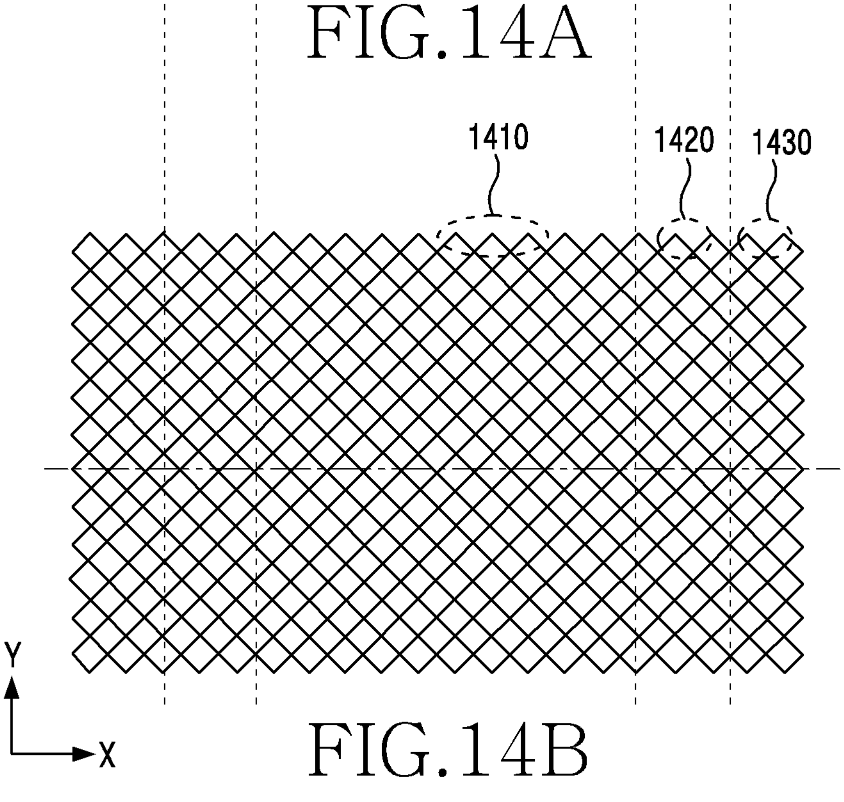

FIGS. 14A and 14B illustrate an example of improving visibility of the display by changing a shape of a conductive mesh pattern according to various embodiments of the disclosure.

Figure 15:
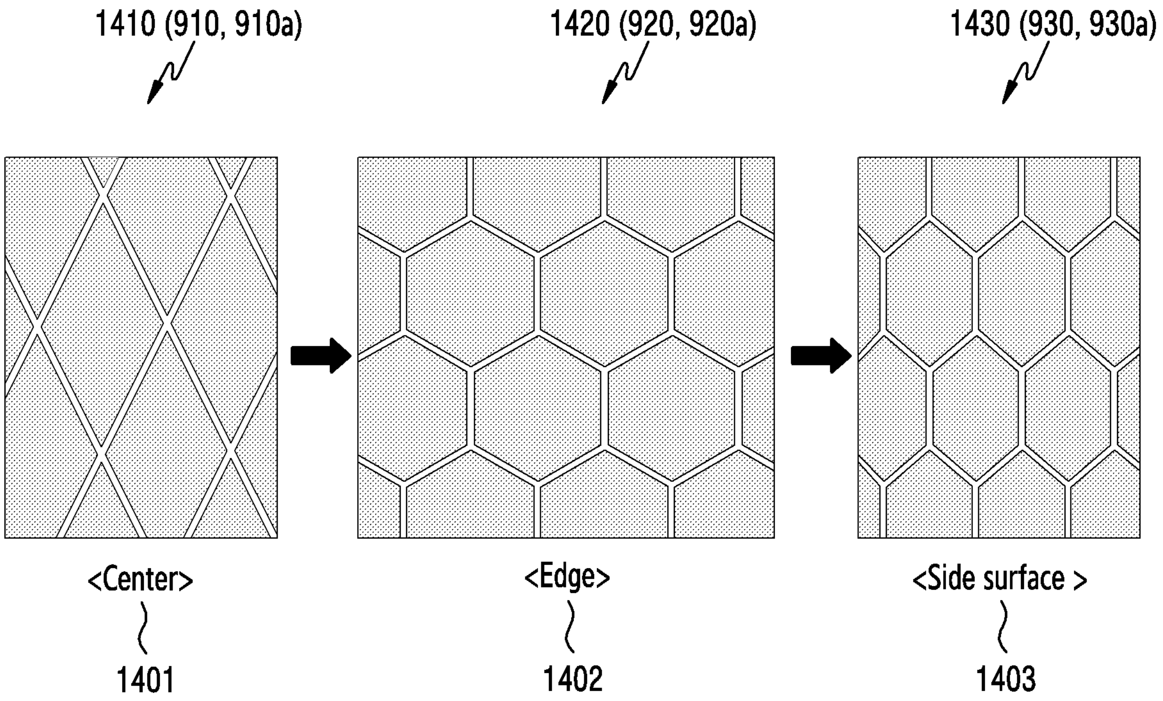
FIG. 15 illustrates an example of a conductive mesh pattern disposed on a center, an edge, and a side surface of a display according to an embodiment of the disclosure.

FIG. 15 illustrates an example of a conductive mesh pattern disposed on a first portion (e.g., the center), a second portion (e.g., the edge), and a third portion (e.g., the side surface portion) of the display according to an embodiment of the disclosure.

Referring to FIGS. 3, 4, 14A, 14B, and 15, the conductive mesh patterns 1400 (e.g., the conductive mesh pattern 1010 of FIG. 10 and the conductive mesh pattern 1300 of FIG. 13A) applied to the third area (e.g., the third area 350 of FIG. 3) may have the first diagonal (e.g., X-axis direction) length of several millimeters. The conductive mesh patterns 1400 applied to the second area (e.g., the fingerprint sensor area, the second area 340 of FIG. 3) may have the first diagonal (e.g., X-axis direction) length of several micrometers.

When the first length of the first diagonal of the conductive mesh patterns 1400 (e.g., the conductive mesh pattern 1010 of FIG. 10, the conductive mesh pattern 1300 of FIG. 13A) of the second area 340 and the second length of the first diagonal of the conductive mesh patterns 1400 (e.g., the conductive mesh pattern 1010 of FIG. 10) of the third area 350 are differently configured, the second area 340 and the third area 350 may be distinctly viewed to the user.

According to an embodiment, the first length of the first diagonal of the conductive mesh patterns 1400 (e.g., the conductive mesh pattern 1010 of FIG. 10, the conductive mesh pattern 1300 of FIG. 13A) of the second area 340 may be configured to be substantially the same as the second length of the first diagonal of the conductive mesh pattern 1400 (e.g., the conductive mesh pattern 1010 of FIG. 10) of the third area 350.

In another embodiment, conductive mesh patterns 1400 (e.g., a conductive mesh pattern 1010 of FIG. 10, a conductive mesh pattern 1300 of FIG. 13A) of a second area 340 and the conductive mesh patterns 1400 (e.g., the conductive mesh pattern 1010 of FIG. 10, the conductive mesh pattern 1300 of FIG. 13A) of a third area 350 may be configured to have a same shape. In another embodiment, the conductive mesh patterns (e.g., the conductive mesh pattern 1010 of FIG. 10, the conductive mesh pattern 1300 of FIG. 13A) of the second area 340 and the conductive mesh patterns (e.g., the conductive mesh pattern 1010 of FIG. 10, the conductive mesh pattern 1300 of FIG. 13A) of the third area 350 may be configured to have a shape of a rhombus, a rhombus (refer to FIG. 10) having the longer length in the first direction (e.g., Y-axis-direction), a hexagon (refer to FIG. 11), or a hexagon (refer to FIG. 12) having the longer length in the first direction (e.g., Y-axis direction).

Referring to FIG. 14A, in an embodiment, the first conductive mesh pattern 1410 disposed in the first portion (e.g., the center 1401) in the first area (e.g., the first area 330 of FIGS. 3 and 4), a second conductive mesh pattern 1420 disposed in the second portion (e.g., the edge 1402), and the third conductive mesh pattern 1430 disposed in the third portion 1403 (e.g., the side surface portion (e.g., the side surface portion 324 of FIGS. 3 and 4) may be configured to have different shapes.

The first conductive mesh pattern 1410 may be configured in a shape of a square (or rhombus in which the lengths of four sides are the same) in the first portion (e.g., the center 1401). The second conductive mesh pattern 1420 may be configured in a rhombus having the longer length in the first direction (Y-axis direction) or the second direction (X-axis direction) in the second portion (e.g., the edge 1402). The third conductive mesh pattern 1430 may be configured in a rhombus having the longer length in the first direction (Y-axis direction) or the second direction (X-axis direction) in the third portion 1403 (e.g., the side surface portion). The length in the first direction (Y-axis direction) or the second direction (X-axis direction) of the third conductive mesh pattern 1430 may be configured to be longer than that of the second conductive mesh pattern 1420.

In another embodiment, according to a current direction of the antenna pattern (e.g., an antenna pattern 820 of FIG. 8A) including the second conductive mesh pattern 1420 or the third conductive mesh pattern 1430, a direction in which the second conductive mesh pattern 1420 or the third conductive mesh pattern 1430 have the longer length may be determined. For example, in case that a current of the antenna pattern 820 flows in the first direction, the second conductive mesh pattern 1420 or the third conductive mesh pattern 1430 is configured to have a rhombus having the longer length in the first direction. According to an embodiment, in case that the current of the antenna pattern 820 flows in the first direction, the length in the first direction of the third conductive mesh pattern 1430 included in the third portion (e.g., the side surface portion 1403) may be equal to or longer than the length of the second conductive mesh pattern 1420 disposed in the second portion (e.g., the edge 1402).

According to yet another embodiment, in case that the current of the antenna pattern 820 flows in the first direction, the conductive mesh pattern (e.g., second conductive mesh pattern 1420 or third conductive mesh pattern 1430) included in the third portion 1403 (e.g., the side surface portion) and the second portion (e.g., the edge 1402) may be configured such that the closer to the first portion (e.g., the center 1401), the shorter the length in the first direction.

According to an embodiment, if a first portion (e.g., the center 1401) and a third portion 1403 (e.g., the side surface portion) are configured to have the conductive mesh pattern having a same shape as the third portion is configured to have a constant curvature, the conductive mesh pattern may be recognized when the display 320 is viewed from outside the housing. According to an embodiment, as illustrated in FIG. 14A, a shape of a rhombus of a second conductive mesh pattern 1420 and a shape of a rhombus of a third conductive mesh pattern 1430 may be different from each other. The length in the first direction (X-axis direction) or the second direction (Y-axis direction) of the third conductive mesh pattern 1430 may be configured to be longer than that of the second conductive mesh pattern 1420. Each of the conductive mesh patterns 1410, 1420, 1430 may be configured to have a shape of a rhombus, wherein the length of the rhombus in the first direction (X-axis direction) or in the second direction (Y-axis direction) gradually increases along a direction from the first portion (e.g., the center 1401) toward the third portion 1403 (e.g., the side surface portion), so as to prevent the conductive mesh patterns 1410, 1420, 1430 from being viewed from the outside. For example, the conductive mesh patterns 1410, 1420, 1430 is less seen in FIG. 14A than in FIG. 14B when viewed from the outside.

Referring to FIG. 15, the shapes of the conductive mesh patterns 1410, 1420, 1430 disposed in the first portion (e.g., the center 1401), the second portion (e.g., the edge 1402), and the third portion (e.g., the side surface portion 1403 (e.g., the side surface portion 324 of FIGS. 3 and 4) in the first area 330 is configured to be different from each other. For example, the first conductive mesh pattern 1410 may be configured in a shape of a square (or a rhombus in which the lengths of four sides are equal to each other) in the first portion 1410. A touch pattern 910 or an antenna pattern 910*a* may be configured by the first conductive mesh pattern 1410. The second conductive mesh pattern 1420 may be configured to have a shape of a hexagon in the second portion (e.g., the edge 1402). A touch pattern 920 or an antenna pattern 920*a* may be configured by the second conductive mesh pattern 1420. The third conductive mesh pattern 1430 may be configured to have a shape of a hexagon having the longer length in the second direction (X-axis direction) or the first direction (Y-axis direction) in the third portion 1403 (e.g., the side surface portion). A touch pattern 930 or an antenna pattern 930*a* may be configured by the third conductive mesh pattern 1430.

According to an embodiment, the third portion 1403 (e.g., the side surface portion) may be configured to have the constant curvature, such that the shape of the conductive mesh pattern and the antenna pattern may be changed in a shape of a rhombus, a hexagon, or a hexagon having the longer length in the first direction (e.g., Y-axis direction), from the center 1401 toward the edge 1402.

Figure 16A:
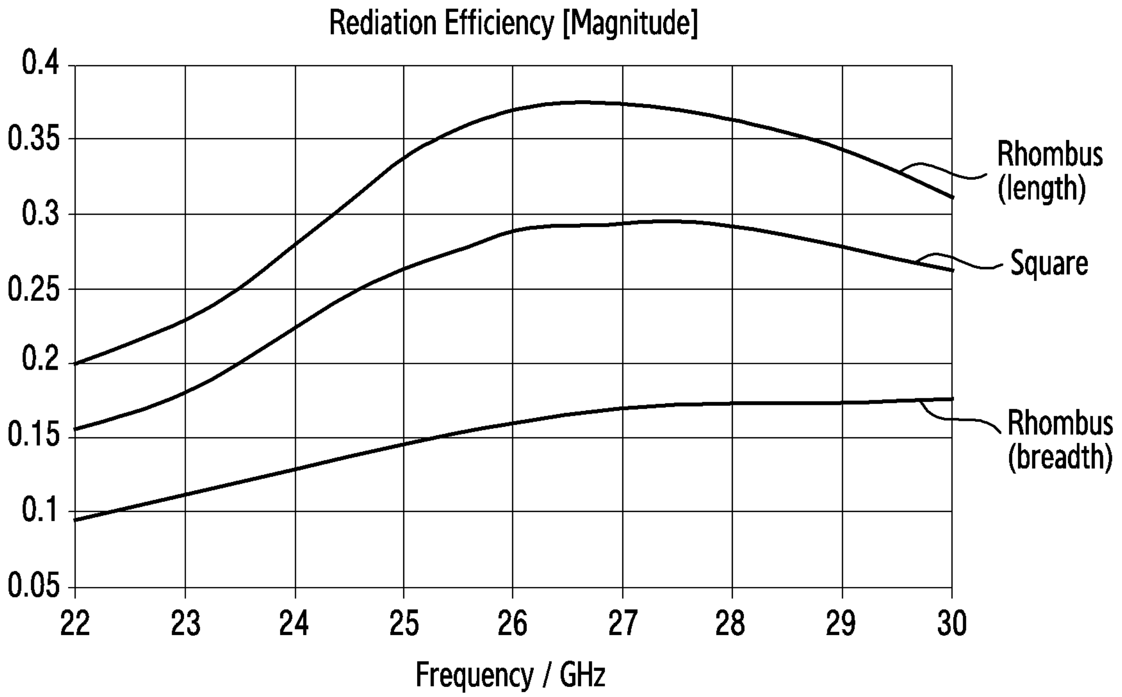
FIGS. 16A and 16B illustrate efficiency comparison of a conductive mesh pattern having a shape of a square, a rhombus, and a hexagon according to various embodiments of the disclosure.
Figure 16B:
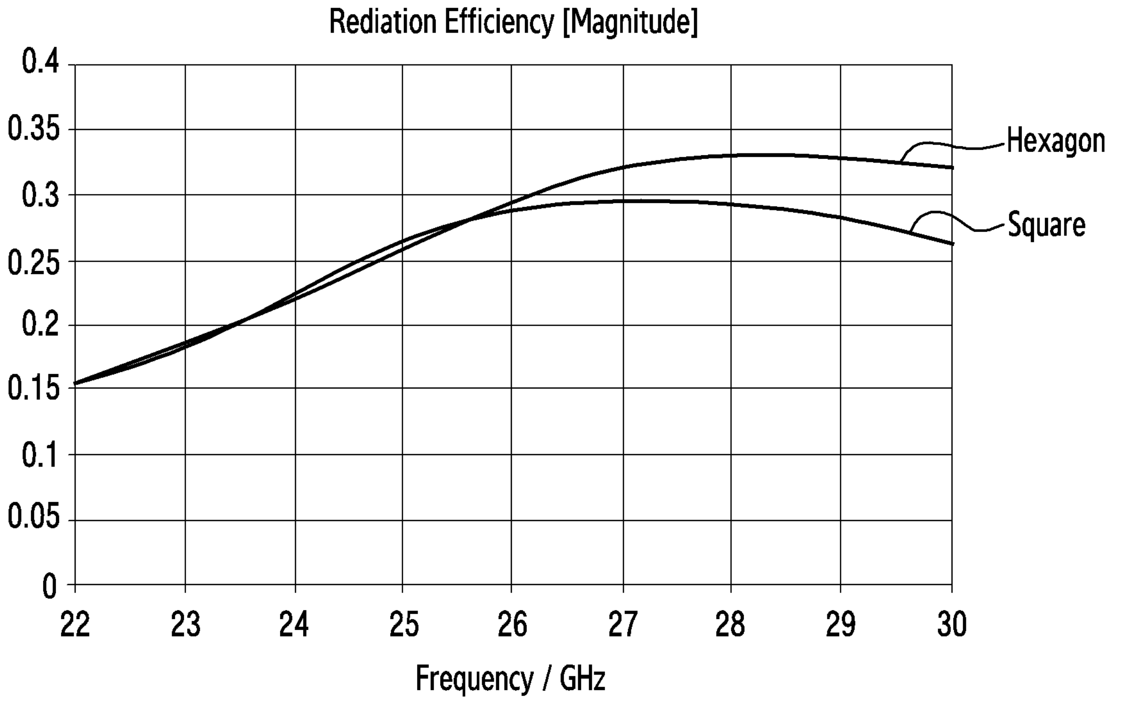

FIGS. 16A and 16B illustrates efficiency comparison of a conductive mesh pattern having a shape of a square, a rhombus, and a hexagon according to various embodiments of the disclosure.

Referring to FIG. 16A, in case that current flows in a first direction in the antenna pattern, the antenna radiation performance in the entire frequency band is higher when the conductive mesh pattern included in the antenna pattern has a shape of a rhombus having the longer length in the first direction than when the conductive mesh pattern has a square shape (or a rhombus shape in which the lengths of four sides are equal to each other). In another example, in case that the current direction of the antenna pattern is in the first direction, the antenna radiation performance in the entire frequency band is higher when the conductive mesh pattern included in the antenna pattern has a shape of a square (or a rhombus shape, in which the lengths of four sides are equal to each other) than when the conductive mesh pattern has a shape of a rhombus having the longer length in the second direction perpendicular to the first direction.

Referring to FIG. 16B, the antenna radiation performance in a frequency band of about 26 hertz (Hz) or more may be higher when the conductive mesh pattern included in the antenna pattern has a shape of a hexagon than when the conductive mesh pattern has a shape of a square.

According to various embodiments of the disclosure, the conductive mesh pattern included in the antenna pattern is configured in the shape of a rhombus or a hexagon, based on the sheet resistance (surface resistance) of the antenna, so as to improve antenna radiation performance.

According to various embodiments of the disclosure, a current direction of the antenna pattern is configured as the first diagonal direction (e.g., Y-axis direction) and a conductive mesh pattern having a shape of a rhombus having a length of a first diagonal longer than a length of a second diagonal (e.g., X-axis direction) orthonormal to the first diagonal (e.g., Y-axis direction) is applied, so as to improve antenna radiation performance.

According to various embodiments of the disclosure, the current direction of the antenna pattern is configured as the first direction (e.g., Y-axis direction) and the conductive mesh pattern having the shape of the hexagon having the length in the first direction (e.g., Y-axis direction) longer than the length of the hexagon of the second direction (e.g., X-axis direction) orthonormal to the first direction is applied, so as to improve antenna radiation performance.

According to various embodiments of the disclosure, in the center portion (e.g., the center 1401 of FIGS. 14A, 14B, and 15) of the display (e.g., the display 320 of FIG. 3), the shape of the antenna mesh pattern may be gradually changed from the shape of the square to the rhombus and from the shape of the rhombus to the rhombus having the longer length in the first direction (e.g., Y-axis direction) toward the side surface portion (e.g., the side surface portion 324 of FIG. 3, the side surface portion 1403 of FIGS. 14A, 14B, and 15) disposed in the first direction of the center portion, so that the antenna pattern may be not recognized when viewed from the outside.

According to various embodiments of the disclosure, in the center portion (e.g., the center 1401 of FIGS. 14A, 14B, and 15) of the display (e.g., the display 320 of FIG. 3), the shape of the antenna mesh pattern may be gradually changed from the shape of the square (or the rhombus) to the hexagon and from the shape of the hexagon to the hexagon having the longer length in the first direction (e.g., Y-axis direction) toward the side surface portion (e.g., the side surface portion 324 of FIG. 3, the side surface portion 1403 of FIGS. 14A, 14B, and 15) disposed in the first direction of the center portion, so that the antenna pattern may be not recognized when viewed from the outside.

The electronic device 101, 800, 800-1 according to various embodiments of the disclosure may include a housing 310 and a display 160, 320. The display 160, 320 may be disposed in an inner space of a housing 310 while being visible from outside the housing and include curved side surface portions 324, 1403. The display 160, 320 may include the plurality of conductive mesh patterns 822, 1010, 1110, 1210 which configure the antennas 710, 720, 730, 740. The plurality of conductive mesh patterns 822, 1010, 1110, 1210 include the first conductive mesh pattern 822*a*, 1410 disposed in a first portion of the display 160, 320 and the second conductive mesh pattern 822*b*, 1420 disposed in a second portion of an outer periphery of the first portion. The first conductive mesh pattern 822*a*, 1410 and the second conductive mesh pattern 822*b*, 1410 have different shapes.

The first conductive mesh pattern 822*a*, 1410 of the electronic device 101, 800, 800-1 according to various embodiments of the disclosure may have a shape of a square or a rhombus.

The second conductive mesh pattern 822*b*, 1420 of the electronic device 101, 800, 800-1 according to various embodiments of the disclosure may have a shape of a rhombus having a longer length in a first direction.

The electronic device 101, 800, 800-1 according to various embodiments of the disclosure may further include a third conductive mesh pattern 1430 disposed in a third portion of an outer periphery of a second portion. The third conductive mesh pattern 1430 may be configured to have a shape different from the first and second conductive mesh patterns 1410, 1420.

The third conductive mesh pattern 1430 of the electronic device 101, 800, 800-1 according to various embodiments of the disclosure may have a shape of a rhombus having a longer length in a first direction.

The electronic device 101, 800, 800-1 according to various embodiments of the disclosure may be configured to have a shape in which the length of the third conductive mesh pattern 1430 in the first direction is longer than that of the second conductive mesh pattern 822*b*, 1420.

The first portion of the electronic device 101, 800, 800-1 according to various embodiments of the disclosure may include the center 1401 of the display 160, 320. The second portion may include the edge 1402 of the display 160, 320. The third portion may include the side surface portions 324, 1403 of the display 160, 320.

The electronic device 101, 800, 800-1 according to various embodiments of the disclosure may configure the second conductive mesh pattern 822*b*, 1420 and the third conductive mesh pattern 1430 to have the length in the first direction and the length in the second direction orthogonal to the first direction, the length in the first direction being different from the length in the second direction, in case that the current of the antennas 710, 720, 730, 740 flows in the first direction.

The second conductive mesh pattern 822*b*, 1420 and the third conductive mesh pattern 1430 of the electronic device 101, 800, 800-1 according to various embodiments of the disclosure may be configured such that the length in the first direction is longer than the length in the second direction.

The second conductive mesh pattern 822*b*, 1420 of the electronic device 101, 800, 800-1 according to various embodiments of the disclosure may be configured such that the closer to the first portion, the shorter the length in the first direction.

The third conductive mesh pattern 1430 of the electronic device 101, 800, 800-1 according to various embodiments of the disclosure may be configured such that the closer to the first portion, the shorter the length in the first direction.

The display 160, 320 of the electronic device 101, 800, 800-1 according to various embodiments of the disclosure may include the display 160, 320 panel, the polarizing layer 520 disposed on the display 160, 320 panel, the dielectric layer 540 disposed on the polarizing layer 520, the window 560 disposed on the dielectric layer 540, and the flexible printed circuit board (FPCB) 570 electrically connected to the dielectric layer 540. The first to third conductive mesh patterns 1410, 1420, 1430 may be configured in the dielectric layer 540.

The first conductive mesh pattern 822*a*, 1410 of the electronic device 101, 800, 800-1 according to various embodiments of the disclosure has a shape of a rhombus having the longer length in the first direction.

The second conductive mesh pattern 822*b*, 1420 of the electronic device 101, 800, 800-1 according to various embodiments of the disclosure may have a shape of a hexagon.

The electronic device 101, 800, 800-1 according to various embodiments of the disclosure may further include the third conductive mesh pattern 1430 disposed in the third portion of the outer periphery of the second portion. The third conductive mesh pattern 1430 may have a shape of a hexagon having the longer length in the first direction.

The electronic device 101, 800, 800-1 according to various embodiments of the disclosure may be configured to have a shape in which a length of a third conductive mesh pattern 1430 in a first direction is longer than that of a second conductive mesh pattern 822*b*, 1420 in case that the current of the antennas 710, 720, 730, 740 flows in the first direction.

The electronic device 101, 800, 800-1 according to various embodiments of the disclosure may include a housing 310 and a display 160, 320. The display 160, 320 may be disposed in an inner space of the housing 310 while being visible from outside the housing and include curved side surface portions 324, 1403. A plurality of touch patterns 910, 920, 930 may be disposed in a front surface of the display 160, 320, and the display 160, 320 may include a center 1401, an edge 1402 of the outer periphery of the center 1401, and a side surface portion 324, 1403 of an outer periphery of the edge 1402. A plurality of conductive mesh patterns 822, 1010, 1110, 1210 configuring antennas 710, 720, 730, 740 may be disposed on the center 1401, the edge 1402, and the side surface portion 324, 1403. A mesh pattern of the first antenna 710 having a first shape may be disposed in the center 1401. A mesh pattern of the second antenna 720 having a second shape different from the first shape may be disposed in the edge 1402. A mesh pattern of the third antenna 730 different from the second shape may be disposed in the side surface portion 324, 1403. The first to third antenna mesh patterns may be disposed adjacent to at least one of the touch pattern 910, 920, 930.

A plurality of the first antenna 710 mesh patterns of the electronic device 101, 800, 800-1 according to various embodiments of the disclosure may have a shape of a square or a rhombus. The second antenna 720 mesh pattern may have a shape of a rhombus or a hexagon having a longer length in a first direction which is equal to the current direction of the antennas 710, 720.

The third antenna 730 mesh pattern of the electronic device 101, 800, 800-1 according to various embodiments of the disclosure may have a shape of a rhombus having a longer length in the first direction or a shape of a hexagon having a longer length in the first direction.

The electronic device 101, 800, 800-1 according to various embodiments of the disclosure may have the third conductive mesh pattern 1430 configured to have a shape having the length in the first direction which is longer than that of the second conductive mesh pattern 822*b*, 1420.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" is implemented in the form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., an electronic device). For example, a processor of the machine (e.g., an electronic device) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing; and a display disposed in an inner space of the housing while being visible from outside the housing and comprising a curved side surface portion, wherein the display comprises a plurality of conductive mesh patterns which configure an antenna, wherein the plurality of conductive mesh patterns comprise a first conductive mesh pattern disposed in a first portion of the display and a second conductive mesh pattern disposed in a second portion of an outer periphery of the first portion, and wherein the first conductive mesh pattern and the second conductive mesh pattern have different shapes based on a sheet resistance of the antenna and an intersection angle of the plurality of conductive mesh patterns.

2. The electronic device of claim 1, wherein the first conductive mesh pattern has a shape of a square or a rhombus.

3. The electronic device of claim 2, wherein the second conductive mesh pattern has a shape of a rhombus having a longer length in a first direction.

4. The electronic device of claim 3, further comprising:

a third conductive mesh pattern disposed in a third portion of an outer periphery of the second portion, wherein the third conductive mesh pattern is configured to have a shape different from that of the first and the second conductive mesh pattern.

5. The electronic device of claim 4, wherein the third conductive mesh pattern has a shape of a rhombus having a longer length in a first direction.

6. The electronic device of claim 5, wherein the third conductive mesh pattern is configured to have a shape having a length in the first direction which is longer than that of the second conductive mesh pattern.

7. The electronic device of claim 4, wherein the first portion comprises a center portion of the display, wherein the second portion comprises an edge of the display, and wherein the third portion comprises the curved side surface portion of the display.

8. The electronic device of claim 4, wherein in case that a current of the antenna flows in the first direction, the second conductive mesh pattern and the third conductive mesh pattern are configured to have a length in the first direction and a length in a second direction orthogonal to the first direction, and wherein the length in the first direction is different from the length in the second direction.

9. The electronic device of claim 8, wherein the second conductive mesh pattern and the third conductive mesh pattern are configured such that the length in the first direction is longer than the length in the second direction.

10. The electronic device of claim 9, wherein the second conductive mesh pattern is configured such that the closer to the first portion, the shorter the length in the first direction.

11. The electronic device of claim 9, wherein the third conductive mesh pattern is configured such that the closer to the first portion, the shorter the length in the first direction.

12. The electronic device of claim 9, wherein the display comprises a display panel, a polarizing layer disposed on the display panel, a dielectric layer disposed on the polarizing layer, a window disposed on the dielectric layer, and a flexible printed circuit board (FPCB) electrically connected to the dielectric layer, and wherein the first to the third conductive mesh patterns are configured on the dielectric layer.

13. The electronic device of claim 1, wherein the first conductive mesh pattern has a shape of a rhombus having the longer length in a first direction, and wherein the second conductive mesh pattern has a shape of a hexagon.

14. The electronic device of claim 13, further comprising:

a third conductive mesh pattern disposed in a third portion of the outer periphery of the second portion, wherein the third conductive mesh pattern has a shape of a hexagon having the longer length in the first direction.

15. The electronic device of claim 14, wherein, in case that a current of the antenna flows in the first direction, the third conductive mesh pattern is configured to have a shape having a length in the first direction longer than that of the second conductive mesh pattern.

* * * * *